United States Patent [19]

Fickelscher

[11] 4,373,925
[45] Feb. 15, 1983

[54] ELASTIC COUPLING

[76] Inventor: Kurt G. Fickelscher, Herderstr. 19, 671 Frankenthal, Pfalz, Fed. Rep. of Germany

[21] Appl. No.: 162,129

[22] Filed: Jun. 23, 1980

Related U.S. Application Data

[63] Continuation-in-part of Ser. No. 943,358, Sep. 18, 1978, abandoned.

[30] Foreign Application Priority Data

Sep. 21, 1977 [DE] Fed. Rep. of Germany ....... 2742442
Jun. 21, 1979 [DE] Fed. Rep. of Germany ....... 2924935

[51] Int. Cl.³ .............................................. F16D 3/54
[52] U.S. Cl. .................................. 464/158; 464/154; 464/73; 464/74; 464/89; 74/462
[58] Field of Search .................... 64/9 R, 11 R, 6, 14, 64/27 R, 27 F, 27 NM; 74/411, 457, 462; 464/73, 74, 89, 154, 158

[56] References Cited

U.S. PATENT DOCUMENTS

| | | | |
|---|---|---|---|
| 2,335,504 | 11/1943 | Gazda | 74/461 |
| 2,479,278 | 8/1949 | Tessendorf et al. | 64/9 R |
| 2,737,033 | 3/1956 | Bendall | 64/14 |
| 3,338,110 | 8/1967 | Iyoi | 74/462 |
| 3,462,971 | 8/1969 | Kaufman et al. | 64/9 R |
| 3,874,194 | 4/1975 | Filepp et al. | 64/9 R |
| 4,047,395 | 9/1977 | Bendall | 64/9 R |

Primary Examiner—P. S. Lall
Attorney, Agent, or Firm—Herbert L. Lerner

[57] ABSTRACT

In an elastic coupling with two similar central gears assemblable on respective shaft ends and having rows of teeth, respectively, disposed adjacent one another, and a planet gear with a row of teeth having an angular pitch equal to that of the rows of teeth of the central gears, the central gears being turnable elastically resiliently so that the flanks of the teeth of the central gears form generally wedge-shaped virtual tooth gaps having a profile varying with reciprocal turning of the central gears, the teeth of the planet gear being also generally wedge-shaped and projecting into the generally wedge-shaped virtual tooth gaps, the tooth flanks of the teeth of the planet gear being in direct contacting engagement with the tooth flanks of the teeth of the central gears, and the teeth of the planet gear and the teeth of the central gears being spring-biased radially toward one another so that the teeth of the planet gear remain fully in engagement in the virtual tooth gaps.

29 Claims, 47 Drawing Figures

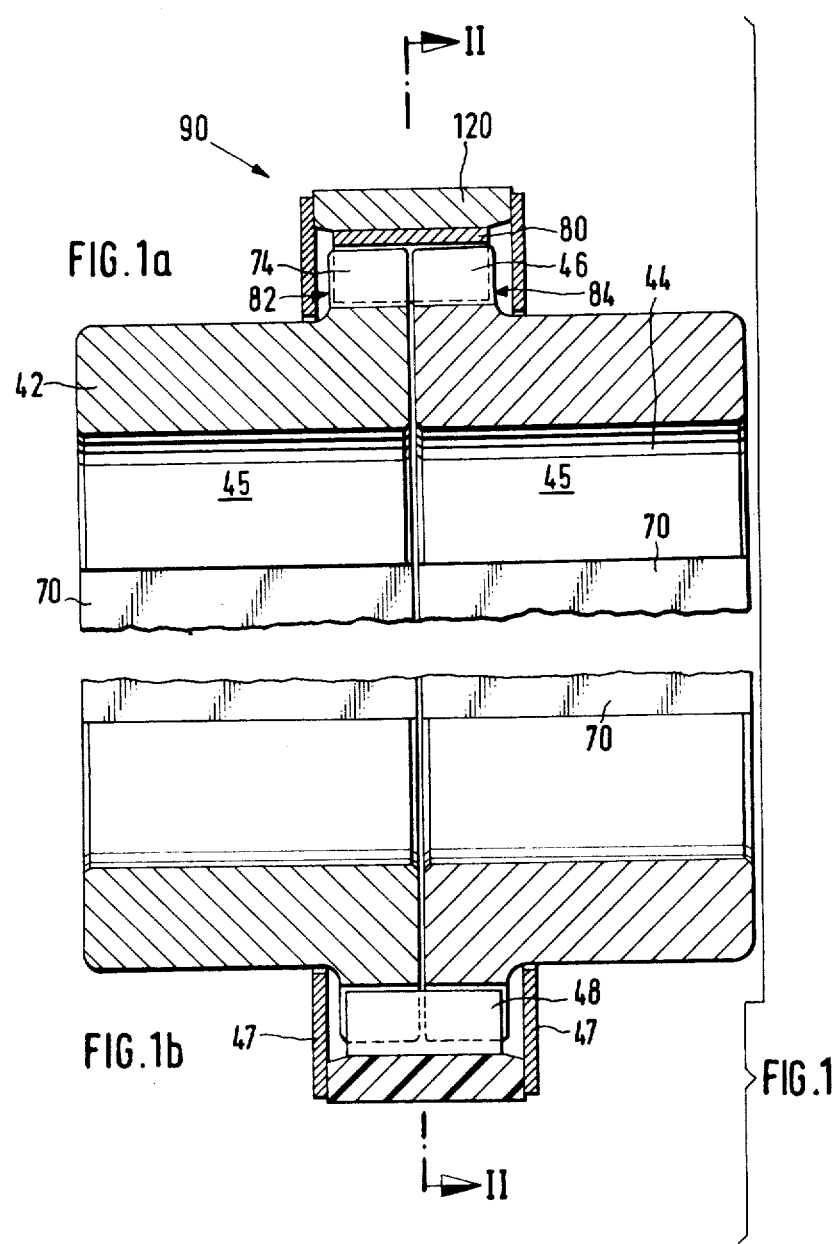

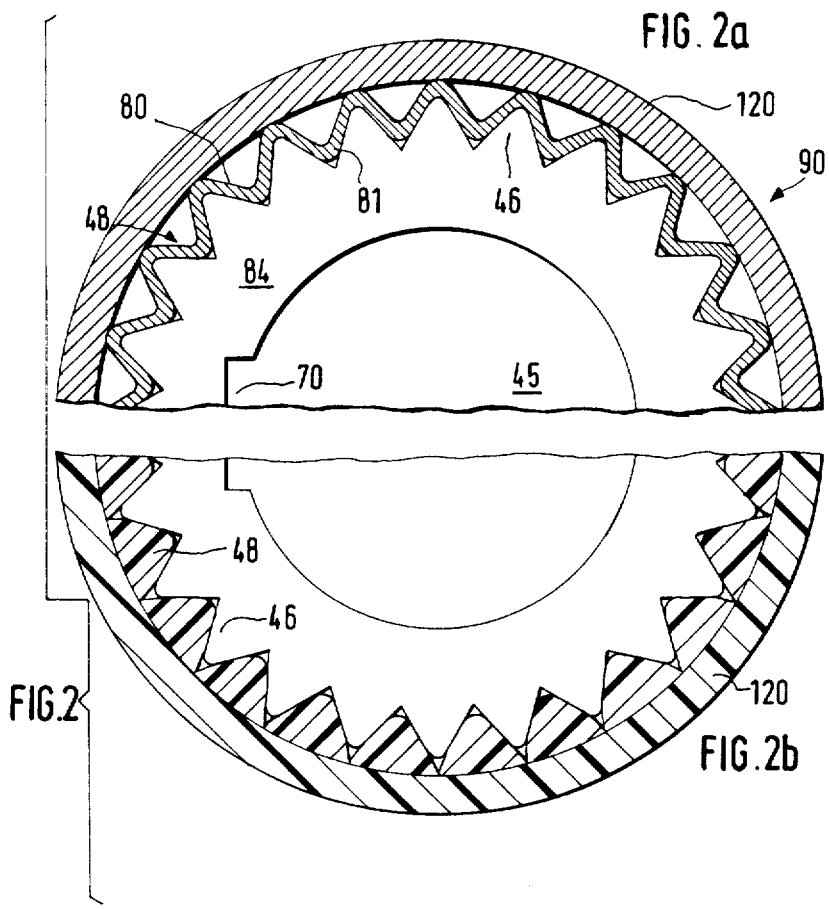
FIG. 2a
FIG. 2b
FIG. 2
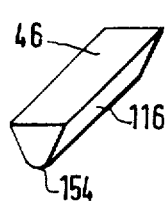
FIG. 3
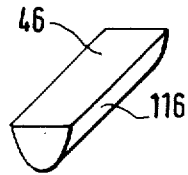
FIG. 4
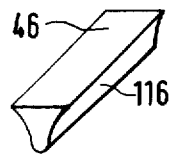
FIG. 5
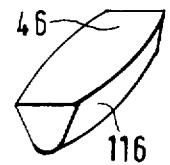
FIG. 6

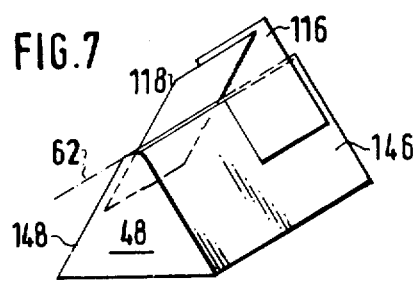
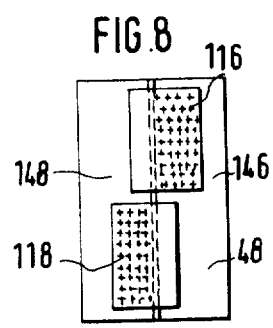
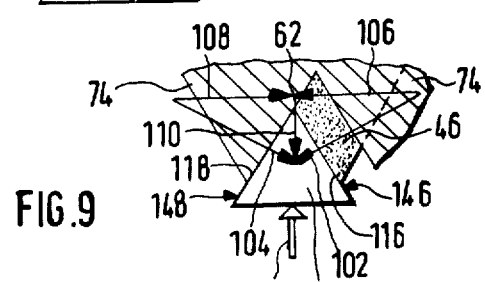
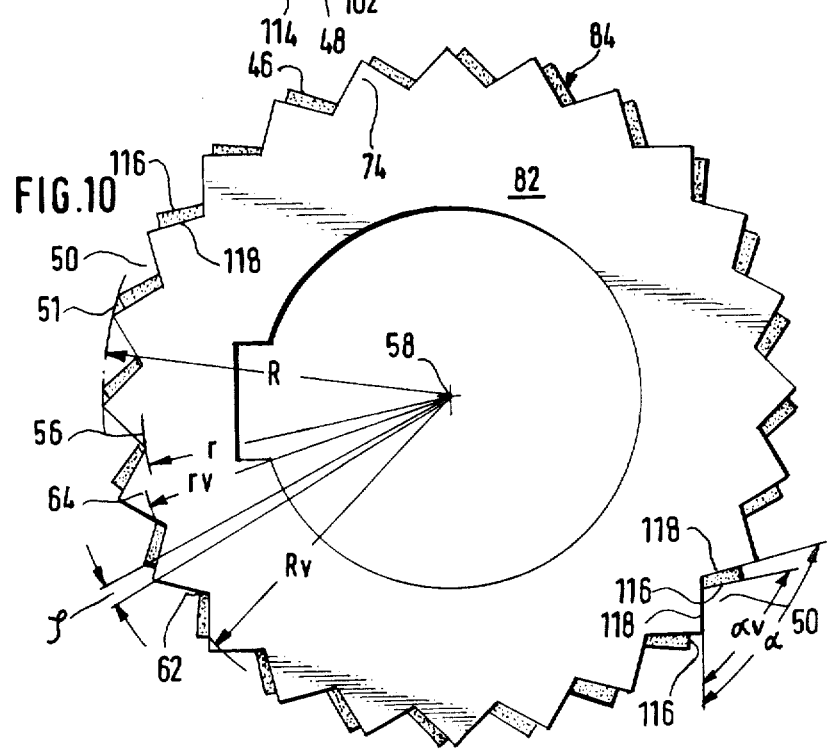

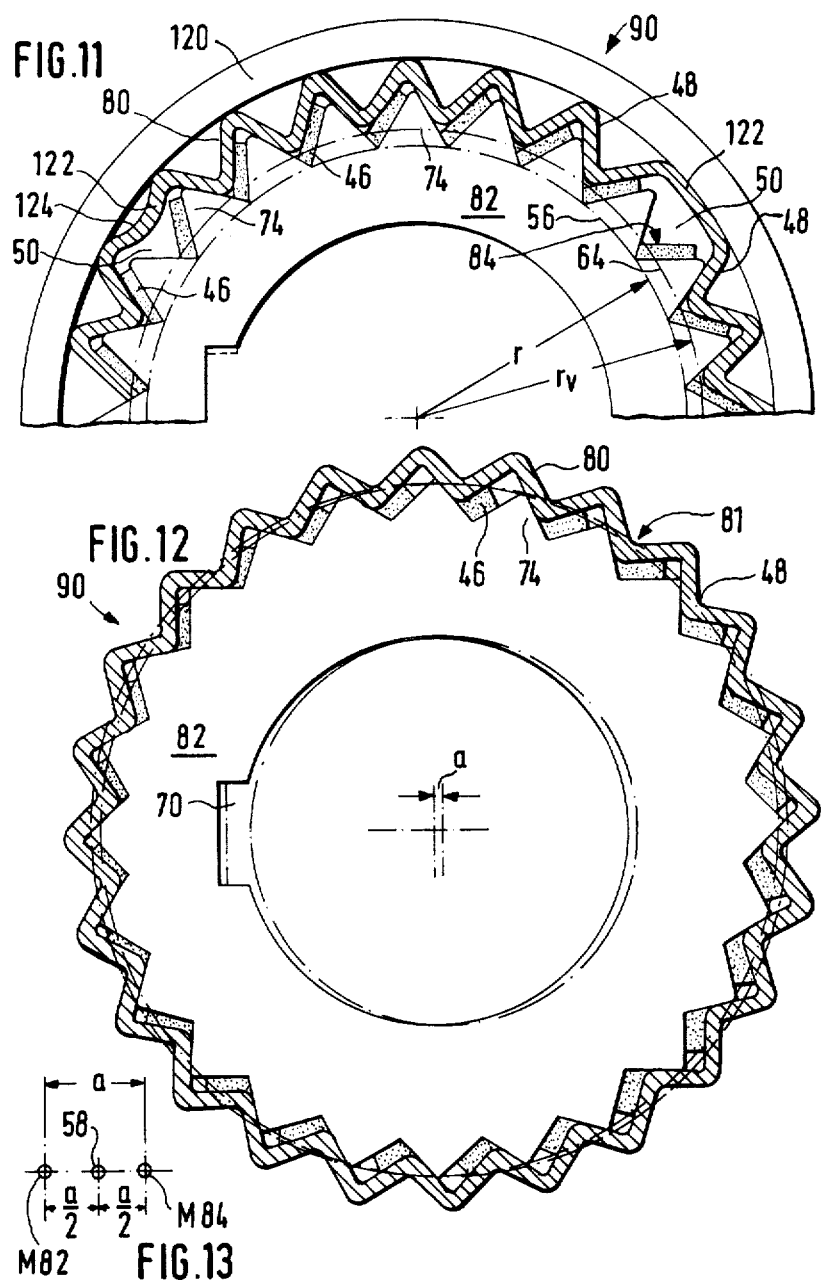

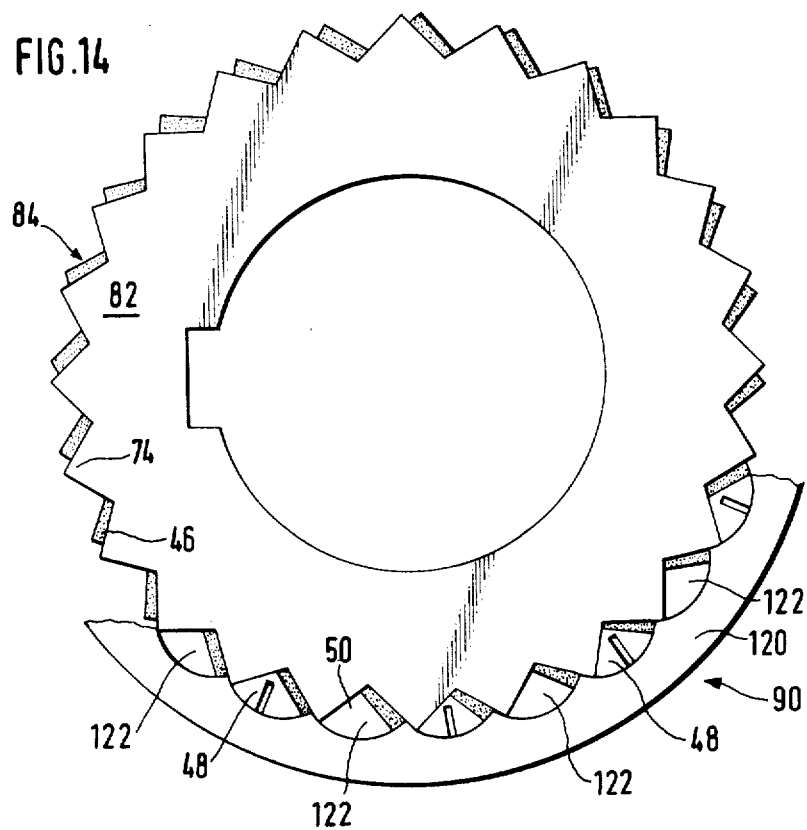
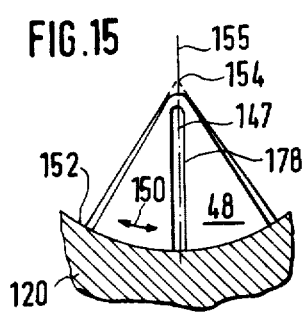
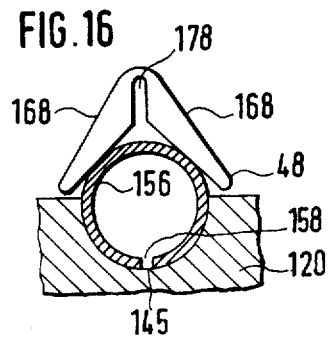

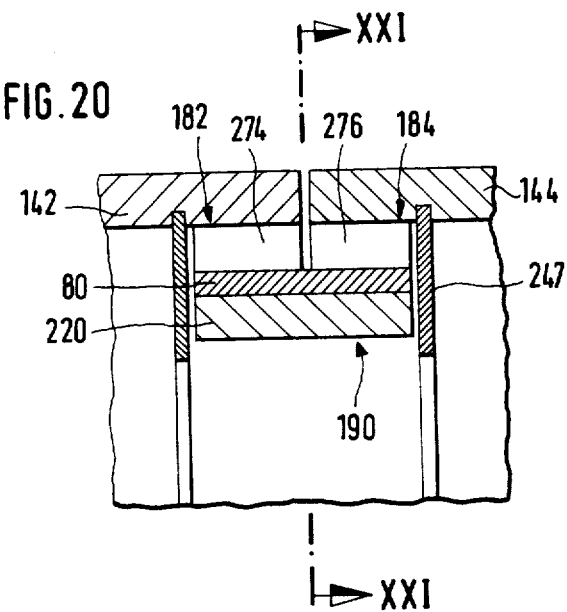
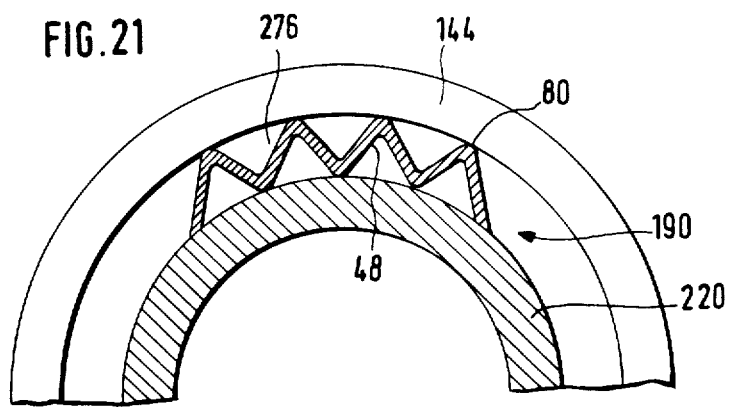

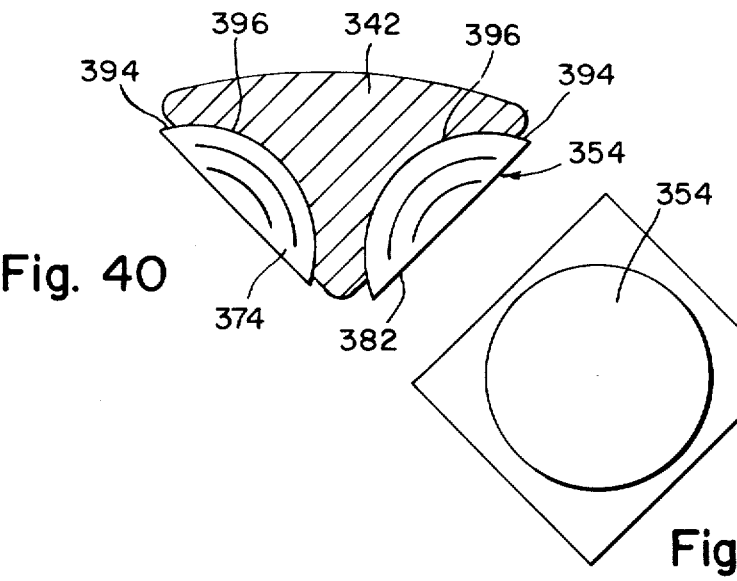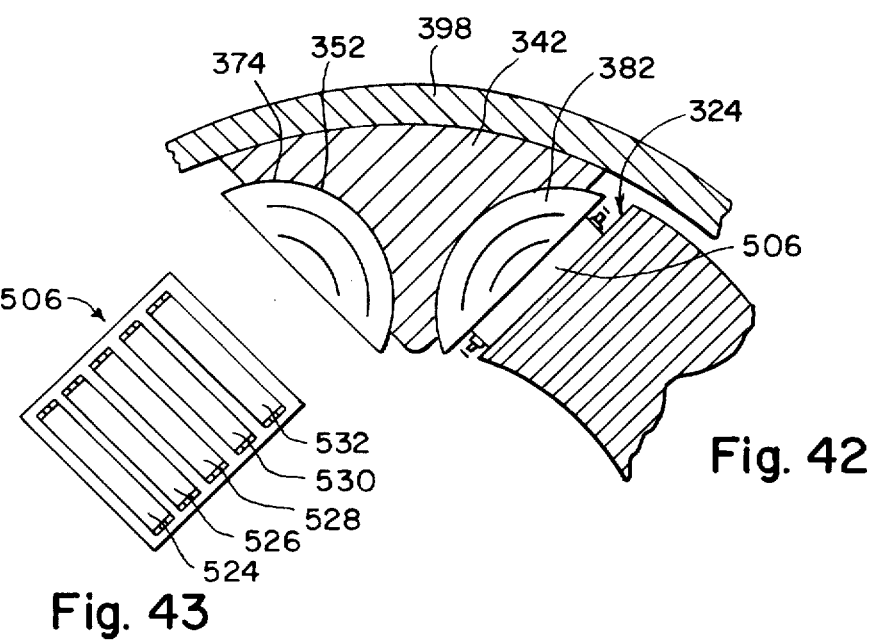

ELASTIC COUPLING

This is a Continuation-in-Part application of application Ser. No. 943,358, filed Sept. 18, 1978, now abandoned.

The invention relates to an elastic coupling with two similar central gears assemblable on respective shaft ends and having rows of teeth, respectively, disposed adjacent one another, as well as with a planet gear, the tooth rows of the planet gear and of the central gears having the same angular pitch, the central gears being turnable elastically resiliently so that the flanks of the teeth of the central gears form generally wedge-shaped virtual tooth gaps having a profile varying with reciprocal turning of the central gears, the teeth of the planet gear being generally wedge-shaped and projecting into the virtual tooth gaps.

In a heretofore-known elastic coupling of this general type (German Published Non-Prosecuted Application DE-OS 2 135 589), so much "tooth air" i.e. space, exists between the teeth of the central gears and the teeth of the planet gear, that a damping member formed of elastomer can be introduced therein. The teeth of the coupling thus do not directly engage one another, but rather, transmission of torque is effected through the elastomer inserted between the tooth flanks and which determines the elasticity of the coupling and which affords reciprocal turning or rotation of both of the central gears. Through this turning or rotation against the elastically resilient resistance of the elastomer, virtual tooth gaps are formed, the profile of which varies with the extent of turning or rotation.

Although the heretofore-known coupling is supposed to serve for transmitting high torque, the amount of this transmissible torque is to be seen, however, only in relationship to those couplings from which the heretofore-known coupling was an improved development and which, for example, has toothing of elastomeric material. Unlimitedly high torques cannot be transmitted namely with the hereinbefore-mentioned prior-art coupling, because the loading capacity and durability of the elastomer establish limits to the transmissible torque.

It is accordingly an object of the invention to provide an elastic coupling which, in addition to meeting the demands conventionally imposed upon an elastic coupling, such as, for example, damping of torsional vibrations and rotary impulses and equalization or compensation of offset of the shafts to be coupled, can transmit unlimitedly high torques and, in spite of being preponderantly constructed as an all-metal coupling, has high elasticity with relatively simple and, consequently, economical construction. Moreover, it is an object of the invention to provide such a coupling as can be employed for as many operating fields or arts as possible and is accommodatable in the elasticity thereof to these fields of use in a relatively simple manner.

The invention also relates to an elastic shaft coupling having two coupling halves respectively carrying a plurality of planar inclined surfaces oriented transversely to the force transmission direction, two respective inclined surfaces of the one and the other coupling halves facing one another pairwise and defining a radially opening intermediate space, at least one slide member disposed in a radially resilient bearing and engaging in the intermediate space and carrying two planar slide surfaces facing away from one another, each of the planar inclined surfaces being in engagement with one of the slide surfaces.

Such an elastic shaft coupling is proposed in the German Published Non-Prosecuted Application (DE-OS) 27 42 442. In that elastic shaft coupling, the coupling halves are constructed as outer-toothed central gears which are surrounded by an inner-toothed planet gear. The planar inclined surfaces of the teeth of the central gear face pairwise toward one another and define radially outwardly opening intermediate spaces. The wedge-shaped tooth of the planet gear engage in these intermediate spaces.

When this heretofore known elastic shaft coupling transmits torque, both coupling halves (central gears) twist or are angularly displaced relative to one another. Thereby, the intermediate spaces become narrowed, and the engaging wedge-shaped teeth of the planet gear are forced outwardly against an elastic inwardly pressing spring force. This elastically acting force, which can be realized in a different manner, produces the elasticity of the shaft coupling of the last-mentioned German Published Application. Because of the sliding of the wedge-shaped teeth of the planet gear on the flanks of the intermediate spaces, this elastic shaft coupling is referred to as a "sliding wedge coupling".

If the coupling halves (central gears) are twisted or angularly shifted through a given torsion angle relative to one another, the inclined surfaces are not shifted in parallel, but rather are pivoted through the same torque angle. A result thereof is that the aperture angle of the intermediate space inclined by two mutually facing inclined surfaces is reduced by the aforementioned torque angle. The larger the torque angle becomes, the smaller (more acute) the aperture angle thus becomes. In the various construction of the last-mentioned German published application, the teeth of the planet gear are accommodated or matched to this angle variation of the intermediate space in that the individual teeth of the planet gear are deformable by the fact that they are formed of flank parts which are articulatingly connected to one another at the respective apices of the teeth. A spring force thereby forces the flank parts elastically apart. If the tooth flanks are even or planar, the inclined surfaces and the slide surfaces are then always disposed exactly parallel to one another; due to the areal or surface contact, high torque can be transmitted without the occurrence of impermissibly high surface pressures or pressure per unit area.

To compensate for an inexact alignment of the shafts to be coupled, there is provided in the last-mentioned German published application that the teeth of the central gears be of spherical construction, the tooth flanks are, in this case, not even or planar so that the inclined and the slide surfaces mutually engage only linearly and the transmissible torque is thereby limited so that a given pressure per unit area may not be exceeded.

It is accordingly another object of the invention to provide an elastic shaft coupling wherein the mutually engaging and sliding slide and inclined surfaces are exactly parallel.

With respect to the compensation for an inexact alignment of the shafts to be coupled, the object is to be understood to the effect that a spherical construction of the inclined surfaces and slide surfaces, respectively, which prevents or limits areal contact, is to be avoided.

With respect to the problem of the compensation for the varying aperture angle of the intermediate space, this object is to be understood to the effect that the exact areal contact should be achieved in spite of the varying aperture angle of the intermediate space without using elastically deformable teeth of the hereinaforementioned type of construction.

The object of the invention is able to be formulated to the effect that the coupling proposed in the last-mentioned German published application should be constructed as a completely metal coupling in which, in every operating condition, the slide and inclined surfaces are exactly parallel and areally engage one another.

In addition thereto, it is an object of the invention to provide such as elastic shaft coupling which is simple in construction and therefore economical to manufacture, and the elasticity thereof is readily easy to adjust to the respective type of application thereof.

With the foregoing and other objects in view, there is provided, in accordance with the invention, an elastic coupling wherein the tooth flanks of the teeth of the planet gear are in directly engaging mesh with the tooth flanks of the teeth of the central gears, and the teeth of the planet gear and the teeth of the central gear are resiliently biased radially toward one another so that the teeth of the planet gear remain in fully meshing relationship with the virtual tooth gaps.

The teeth of the central gears thus remain in direct meshing relationship with the teeth of the planet gear, and no elastic damping members are intermediately connected in the path of force flow from tooth to tooth, so that any desirably high torques are transmissible, the size of which depends solely upon the shear strength of the teeth.

The elasticity of the coupling is attained through resilient biasing of the teeth directed radially toward one another, which has the effect that the teeth which are meshing can be accommodated or matched to the virtual tooth gaps varying with the turning or rotation of the central gears, this accommodation or matching and consequent turning or rotation of the central gears being possible against the resistance of the radial resilient biasing action. Through suitable selection of the strength of this resistance i.e. of the resilient bias, the extent of the turning or rotation and, therewith, the rotary or torsional elasticity of the coupling can be determined.

The coupling according to the invention is distinguished with respect to the operation thereof i.e. in the kinematic principle thereof, primarily, from the aforementioned heretofore-known coupling of this general type.

In the aforementioned prior-art coupling, the torque transmission is effected over the base member of the planet gear. In the coupling according to the invention, on the other hand, the torque transmission is effected in a manner that each individual tooth of the planet gear is directly torque-transmitting and is stressed in shear, whereas the base member of the planet gear transmits no torque and can, consequently, be radially elastically constructed and can, therefore, be employed for radial, resilient biasing of the teeth.

The primary advantages of the elastic coupling according to the invention are summarized as follows:

(a) In a rigid coupling (very hard setting of the reciprocal resilient biasing of the teeth) an optimal centering of the shafts that are to be mutually coupled is able to be achieved.

(b) With respect to the outer diameter, higher torques can be transmitted than for heretofore known couplings.

(c) The coupling can be constructed from rigid to highly elastic through suitable resilient biasing without any material difference in the basic elements thereof; it is also possible to effect the construction of the coupling in a manner that the elasticity thereof is adjustable.

(d) Under load and also for very high load variations, the teeth of the coupling remain always in contact, so that no gap corrosion and spark formation can occur. The coupling is free of play.

(e) Since the tooth row of the planet gear does not mesh directly with the tooth rows of the central gears, but rather, meshes with a virtual tooth row, an existing shaft offset is cut in half i.e. it has only half the effect upon the teeth; the restoring forces are accordingly reduced.

(f) With suitable construction of the planet gear and the teeth thereof, large shaft offsets can be bridged, the planet gear then, on the one hand, effecting a rotary movement of the shaft and, on the other hand, a superimposed radial movement.

(g) The coupling is very easily assemblable and disassemblable (h) Between the teeth of the planet gear and the teeth of the central gears, only a relatively slight contact pressure takes place, which is selective through the choice of tooth count and tooth dimensioning.

(i) Even shafts of varying diameter can be well centered with respect to one another.

(j) If the radial resilient biasing of the teeth is so formed that it is effective even during the absence of reciprocal turning or rotation of the central gears, such as during stoppage, for example, a connection of the parts to be coupled in axial direction is achieved through the coupling, so that, if desired, any fixation against displacement in axial direction can be dispensed with or, at least, a simplification of a fixation against axial displacement can be achieved.

The terminology selected for the invention of the instant application, which is normally used only for planetary transmissions, supports the conclusion throughout that the structural components of the coupling according to the invention, together with the course of travel thereof, are similar to those which are conventional for planetary transmissions.

In accordance with another feature of the invention, an elastic base member carrying the teeth of the planetary gear is provided for radial resilient biasing of the planetary gear. This construction is especially simple, because only a single base element, namely the base member or main body part must be elastically constructed.

In order, however, to attain an especially good meshing of each individual tooth of the planet gear in the tooth gaps of the central gears associated therewith, in accordance with a further feature of the invention, the teeth of the planet gear are radially resiliently constructed for radial resilient biasing.

In many cases it may, however, be more desirable and in accordance with an added feature of the invention, for effecting radial resilient biasing, to provide the teeth of the central gears with a radially resilient construction.

In accordance with an additional feature of the invention, for effecting radial resilient biasing, the central gears have respective base members of radially resilient construction.

So many different possibilities are thus provided for achieving resilient biasing of the teeth so that, respectively, the embodiment accommodated to or suited to the existing use can be selected.

To adjust the damping characteristic for torsional vibrations and/or rotary impulses, various possibilities are provided. Thus, to achieve a uniform damping characteristic, the flank surfaces of the teeth of both central gears are of planar construction, in accordance with yet another feature of the invention.

If, on the other hand, a damping is desired which increases with increasing turning or rotation of the central gears, in accordance with yet a further feature of the invention, the tooth flanks of the teeth of the two central gears have concave surfaces in direction of the height of the teeth thereof.

If, on the other hand, a damping characteristic is required in opposite sense, in accordance with yet an added feature of the invention, the tooth flanks of the teeth of the two central gears have convex surfaces in direction of the height of the teeth thereof.

If the shafts to be coupled are inclined to one another by a slight angle, in accordance with yet an additional feature of the invention, which compensates for this inclination, the flank surfaces of the teeth of the two central gears have convex surfaces in direction of the width of the teeth thereof, the flank surfaces of the teeth being spherically shaped.

An especially economical construction with respect to installation and assembly, and in accordance with another feature of the invention, at least one of the central gears is constructed as a zig-zag metal sheet connectible directly to the respective shaft end against rotation relative thereto. If externally toothed central gears are used, the connection against relative rotation is that the coupling hub or the shaft has rounded-off notches extending in axial direction on the surface thereof, points of the zig-zag metal sheet being seated in those notches. Welding is unnecessary because the teeth of the planet gear always press inwardly and thereby exclude the possibility that the zig-zag metal sheet will spring out of the notches, if the notches are adequately deep. A further simplification of the assembly is provided in that the zig-zag metal sheet need not be closed because, in the circumferential direction thereof no forces are transmitted. In fact, special coupling hubs can be dispensed with, if the notches are directly applied to the shaft, in accordance with another feature of the invention.

In a similar manner, the construction is simplified when, in accordance with a further feature of the invention, the tooth row of the planet gear is constructed as a zig-zag metal sheet. This zig-zag metal sheet need also not be closed on itself if it is surrounded and held together on the outside of the hollow member of the planet gear; if, on the other hand, a zig-zag metal sheet closed on itself is used as the planet gear, he base member can be fully dispensed with. This very simple construction of a couling in accordance with the invention is then formed of only three zig-zag metal sheets:

(a) two zig-zag metal sheets, which need not be closed on themselves, are mounted against relative rotation in notches formed in the shifts;

(b) a third, closed zig-zag metal sheet sufficiently strong for torque transmission forms the planet gear.

To accommodate to the virtual tooth gap, in accordance with a further feature of the invention, the teeth of the planet gear are shiftable in circumferential direction. With a zig-zag metal sheet, this possibility is afforded of itself. If the teeth are braced against the base member of the planet gear, in accordance with an added feature of the invention, the teeth of the tooth row of the planet gear are elastically pivotable for accommodating the respective teeth at the virtual tooth gaps.

During a reciprocal turning or rotation of the central gears, not only the size of the virtual tooth gaps, but also, the flank angle of the virtual tooth gaps varied. For this reason, it is advantageous to have a possibility of resiliently adjusting the flank angle of the teeth of the planet gear so that the flank angle of the teeth of the planet gear can be accommodated to the varying flank angle of the virtual tooth gaps. Thus, in accordance with an added feature of the invention, the teeth of the tooth row of the planet gear are respectively, formed of two flank parts articulatingly connected to one another at the apex of the respective teeth, spring means are disposed between the two flank parts for biasing the two flank parts away from one another, the planet gear having a base member supporting the spring means, the two flank parts terminating at respective locations spaced from the base member of the planet gear so as not to obstruct the pivotability.

In order to permit pivotability of the teeth of the central gear so that the tooth pitch of the virtual tooth row can be varied somewhat, there is provided, in accordance with an added feature of the invention, that at least one of the central gears has a base member and the teeth of the at least one of the central gears have respective feet connected by only a relatively narrow, yieldable strip to the base member of the central gear.

In most of the situations of use and in accordance with another feature of the invention, the central gear is externally toothed and is surrounded by an internally toothed planet gear. If hollow shafts should, however, be coupled to one another or if the coupling hubs are of hollow construction, the central gears are internally toothed and surround the externally toothed planet gear.

In the initially mentioned heretofore known coupling, both central gears and the planet gear have the same tooth count.

In the inventive coupling of the instant application, on the other hand, the tooth row of the planet gear is formed with faulty locations at which respective teeth are omitted.

In accordance with a concomitant feature of the invention, the faulty locations are disposed at regular intervals along the tooth row of the planet gear. This is, for example, economical if the shafts have such a large circumference that only relatively few teeth at the planet gear are enough for transmitting the particular torque. The remaining teeth can then be omitted, yet the teeth remaining are advantageously distributed equidistantly over the circumference that is available. In this case, one cannot speak of the tooth count of the planet gear being equal to the tooth count of the central gears as in the case of the aforementioned heretofore-known coupling.

On the contrary, in this case, only the angular pitch of the teeth of the planet gear agrees with the angular pitch of the central gears.

If the resilient bias of the teeth of the planet gear is adjusted as soft or weak, high torques can cause the teeth of the planet gear to be forced fully out of the virtual tooth gaps. The coupling then operates as a slipping coupling and limits the transmissible torque. This effect can be provided in an especially simple manner by using zig-zag metal sheets.

In accordance with another feature of the invention, there is provided an elastic shaft coupling having two coupling halves respectively carrying a plurality of planar inclined surfaces oriented transversely to a force transmission direction therebetween, two respective inclined surfaces of the one and of the other coupling halves facing one another pairwise and defining a raidally opening intermediate space, at least one slide member disposed in a radially resilient bearing and engaging in the intermediate space and carrying two planar slide surfaces facing away from one another, each of the planar inclined surfaces being in engagement with one of the slide surfaces, comprising a spherical segment-shaped compensating member formed with at least one of the planar surfaces associated with the other of the planar surfaces and defining the intermediate space, the compensating member being universally pivotally supported in a hollow spherical bearing bushing, from two to twelve of the intermediate spaces being defined by the respective inclined surfaces, a respective slide member being received in each of the intermediate spaces, and holding ring means for pressing the slide members into the respective intermediate chambers, the holding ring means being of radially resilient construction due to noncircular deformability thereof.

By a "spherical segment-shaped compensating member" there is meant a member which
(a) is pivotally supported with a spherical segment-shaped or spherical calotte-shaped surface in the hollow spherical bearing bushing,
(b) carries a planar surface (slide surface or inclined surface) of the intermediate space.

Due to the support of a slide surface and/or an opposing inclined surface pivotable about a pivot point, assurance is provided that the pivotally mounted surface will always adjust parallel to the other surface. Without using deformable teeth of the hereinaforementioned type of construction i.e. especially with a fully inelastic, hard, metallic slide member, compensation is provided, in this manner, for an inexact alignment of the shafts and/or a variation of the aperture angle of the intermediate space.

Through the selection of a suitable number of intermediate spaces and slide members, respectively, the coupling can be readily adjusted to the respective type of application.

The holding ring is elastically deformed by the radially (outward or inward) pressing slide members, whereby it oppositely (inwardly or outwardly, respectively) deforms between the regions in which it engages the slide members.

Therefore, the elasticity of the coupling is able to be influenced by the construction of the elastically deformable holding ring. If the wall thickness of the holding ring in relation to the diameter is very small and, thereby, the holding ring is easily deformable, this indicates a greater elasticity of the coupling with respect to an embodiment with a holding ring of greater wall thickness. The elasticity of the coupling can thereby additionally be influenced by the aperture angle of the intermediate spaces. For a small aperture angle of the intermediate spaces, for example, 30° to 60° for an unstressed or nonloaded coupling, at a given torque to be transmitted, the radial force acting upon the slide member is smaller than for a larger aperture angle. Thereby, the influence of the elastic holding ring upon the elasticity of the coupling is also smaller than for larger aperture angles of the intermediate spaces.

Seen in its entirety, the elastic shaft coupling according to the invention thus fulfills the demands imposed upon such a coupling with respect to construction, adaptability or adjustability to given operating conditions, simple and reliable transmission mechanism of the torque as well as simpler influencing of the torsional elasticity.

It should also be noted with respect to the aperture angle of the intermediate spaces that good sliding of the slide surfaces on the inclined surfaces is possible so that, with a torsion or angular displacement of the coupling halves relative to one another, the friction of the mutually engaging surfaces is exceeded and a radial displacement of the slide member is possible.

In order also to be able to vary the damping characteristic curve, if necessary or desirable, even subsequently, in accordance with a further feature of the invention, at least one radial stop for the holding ring is disposed at the periphery between two of the respective intermediate spaces on at least one of the coupling halves, the stop being advantageously adjustable or elastic in radial direction.

In accordance with an added feature of the invention, an even number of the slide members is provided, respective pairs of adjacent inclined surfaces associated with the respective slide members being disposed on the same coupling half.

In this manner, the elastic shaft coupling is constructed in accordance with the principle of a claw or jaw coupling which is elastic in both rotary directions, the intermediate spaces being formed between the individual jaws.

In most applications of use, in accordance with the invention, the holding ring surrounds the slide members, and the intermediate spaces widen radially outwardly. In couplings revolving with high rotary speeds, it is advisable that the holding ring be surrounded by the slide members i.e. be disposed in the interior, and the intermediate spaces widen radially inwardly.

In accordance with an added feature of the invention, a plurality of the compensating members are supported in the coupling halves, and the slide members are formed of slide wedges having the slide surfaces thereon. This embodiment is provided especially for couplings which have to overcome a small torque, for example, smaller than 100 kpm (kilopond per minute). In such couplings, the individual parts are of correspondingly small construction, and an adequate support for the slide members is possible, for the most part, only in the coupling halves.

If a coupling is provided, however, for transmitting greater torque, for example, greater than 100 kpm, and, thereby, the individual structural components have very large dimensions, it is advisable, in accordance with the invention, for the compensating members to be supported in the slide members and to have the slide surfaces formed thereon.

With respect to the inclined surfaces, various embodiments are possible in accordance with the invention. If the offset or shift of the shafts to be coupled is small, for example, at most 1/100 to 1/75 of the shaft diameter, and/or the angular shaft or offset of the shafts is small, for example, at most 2°, it is sufficient, in most cases, to form the inclined surfaces directly on the coupling halves, if the compensating members are mounted in the slide members.

In other cases wherein the aforementioned conditions do not apply, in accordance with a concomitant feature of the invention, the inclined surfaces are formed on additional spherical segment-shaped compensating members supported in the coupling halves i.e. compensating members are supported both in the slide members as well as in the coupling halves.

Other features which are considered as characteristic for the invention are set forth in the appended claims.

Although the invention is illustrated and described herein as embodied in an elastic coupling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is an axial sectional view of an elastic coupling constructed in accordance with the invention, the lower and upper halves of the figure showing two different embodiments of the planet gear forming part of the coupling;

FIG. 2 is a sectional view, slightly reduced, of FIG. 1 taken along the line II—II in direction of the arrows;

FIGS. 3, 4, 5 and 6 are perspective views of different embodiments of respective teeth of a central gear of the coupling;

FIGS. 7, 8, 9 are diagrammatic perspective, plan and side elevational (partly sectional) views, respectively, of the disposition of a tooth of the planet gear between adjacent teeth of the central gears;

FIG. 10 is a side elevational view of a pair of adjacently disposed central gears;

FIG. 11 is a side elevational view of the upper half of the coupling of FIG. 1 with a torsion angle of the central gears;

FIG. 12 is a side elevational view of a coupling according to the invention with staggering or offsetting of the central gears;

FIG. 13 is an enlarged fragmentary diagrammatic view of FIG. 12 for use in explaining the staggering of the central gears;

FIG. 14 is a side elevational view of another embodiment of the coupling with pivotable teeth of the planet gear;

FIG. 15 is an enlarged fragmentary view of FIG. 14 showing one of the teeth of the planetary gear;

FIG. 16 is another view similar to that of FIG. 15 of another embodiment of a tooth of the planet gear and the mounting therefor;

FIG. 20 is a fragmentary axial-sectional view showing the upper half of a coupling with internally toothed central gears;

FIG. 21 is a cross-sectional view of FIG. 20 taken along the line XXI—XXI in direction of the arrows;

FIG. 40 is a sectional view of a slide member with a compensating member;

FIG. 41 is a side elevational view of FIG. 40;

FIG. 42 shows the slide member of FIG. 40 with the sliding surface of the compensating member thereof opposing an inclined surface with a needle-bearing cage therebetween;

FIG. 43 is a side elevational view of the needle-bearing cage of FIG. 42;

Like parts are identified by the same reference numerals in all of the figures. Furthermore, individual recurrent structural features are provided with reference numerals only insofar as they may be necessary for an understanding of the invention.

Figure 17:
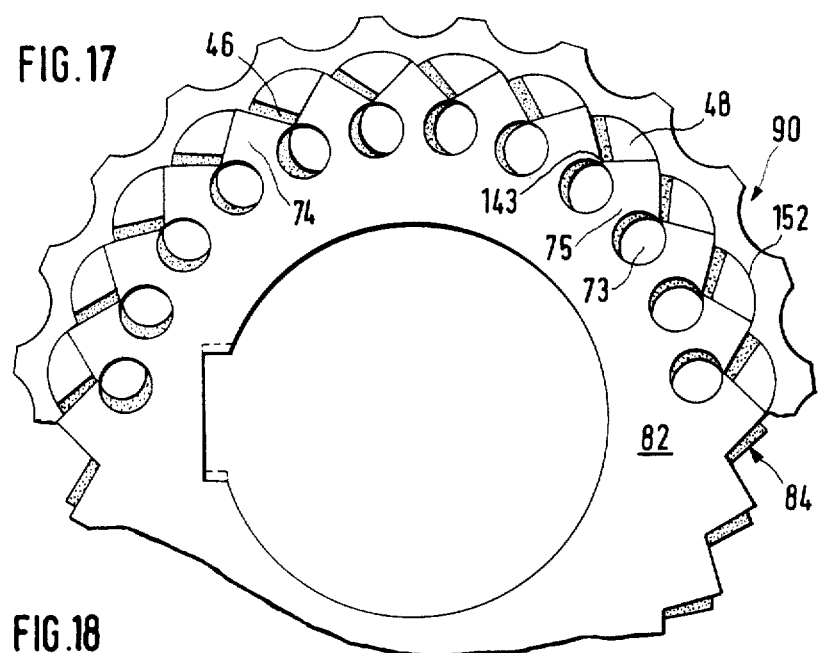
FIG. 17 is a fragmentary side elevational view of yet another coupling according to the invention having central gears with movable teeth.

Referring now to the drawing and first, particularly, to FIGS. 1 and 2 thereof, there is shown a coupling according to the invention mainly formed of an internally toothed planet gear 90 and two externally toothed central gears 82 and 84. Teeth 46 and 74 of the central gears 84 and 81 respectively, are disposed on two coupling hubs 44 and 42, respectively, which are provided on non-illustrated shaft ends, respectively, with a bore 45 as well as with key slots 70 for affording means for mutually fastening the hubs 42 and 44 against rotation relative to one another. In this regard, the disposition of the two central gears 82 and 84 is such that they are located approximately aligned and directly adjacent one another.

The number and the shape as well as all of the features characterizing a tooth system of the teeth 46 and 74 of the two central gears 84 and 82, respectively, are identical and are disposed adjacent one another so that a respective tooth 48 of the planet gear 90 is in engagement with the teeth 46, 74 of the central gears. In addition thereto, it is necessary that the axial width of the teeth 48 of the planet gear is approximately as great as the common axial extension of the teeth 46 and 74 of the central gears.

The construction of the planet gear 90 is best ascertained from the sectional view of FIG. 2, the upper and lower halves of which show two possible embodiments of the planet gear 90.

The planet gear 90 according to the upper half of FIG. 2 has a circular base member 120 having an axial width somewhat greater than the axial extension of the teeth 48 of the planet gear.

The base member 120 is formed, in this regard, of metal, such as steel, for example, and the teeth 48 of the planet gear 90 are formed of a zig-zag or corrugated metal sheet 80 which is inserted into the ring-shaped base member 120.

The corrugated metal sheet 80 is folded so that the points or teeth 81 thereof engage in the tooth gaps of the central gears 82 and 84 and consequently form the teeth 48 of the planet gear 90. The corrugated metal sheet 80 is preferably formed of elastic, resilient material, such as steel, for example, having a thickness which is small relative to the diameter of the base member 120. The thickness of the corrugated metal sheet 80 is approximately 1 to 5 mm, and preferably 2 to 3 mm.

In the lower half of FIG. 2, which shows a different embodiment of the planet gear 90, the ring-shaped base member 120 is formed of elastic material, such as rubber or a suitable synthetic or plastic material, the the teeth 48 are of filled-in or solid construction. The teeth 48 need not be mutually fastened, nor need they be fastened to the elastic base member 120; but rather, it is sufficient to dispose the teeth individually and loosely in the tooth gaps of the central gears 82 and 84. The teeth are prevented from falling out of the tooth gaps in radial direction by the elastic base member 120 and, as is apparent from FIG. 1, rings 47, which are laterally fastened to the base member 120 and extend up to about the coupling hubs 42 and 44 prevent the loose teeth 48 from falling out laterally. These rings 47 serve simultaneously as protection against penetration of dirt into the toothing or tooth system and prevent loss of lubrication medium, such as grease or oil, for example, which is introduced, if desired, into the toothing.

In FIGS. 3 to 6, a tooth, respectively, of a central gear 46 or 84 is shown in perspective view as a detail and in various embodiments. Although, in FIGS. 3 to 6, the teeth appear formed of solid material, these individual tooth shapes are also realizable of zig-zag or corrugated metal sheet 180 according to FIGS. 18 and 19, the corrugated metal sheet 180 being suitably folded.

The tooth 46 of the central gear according to FIG. 3 is rounded off at the apex 154 thereof and has tooth flanks 116 which are formed flat or planar in direction of the tooth height.

The tooth 46 according to FIG. 4 has tooth flanks 116, which are of convex construction in direction of the tooth height, whereas, in FIG. 5, the tooth 46 has tooth flanks 116 of concave construction.

In FIG. 6, a tooth 46 is shown having tooth flanks 116 of spherical construction i.e. the tooth flanks 116 are outwardly arched or cambered in direction of the tooth width. In a coupling, only teeth of a single embodiment would obviously be employed for the central gears, the teeth of the planet gear having to match this tooth shape of the central gears.

FIGS. 7 and 8 disclose a tooth 48 of the planet gear and how it cooperates with the teeth 46 and 74 of the central gears. In this regard, the teeth 46 and 74 are indicated only by the tooth flanks 116 and 118 of the teeth 46 and 74. It is apparent that the one tooth flank 146 of the tooth 48 engages the tooth flank 116 of a central-gear tooth, while the other tooth flank 148 of the tooth 48 engages the tooth flank 118 of another central-gear tooth. Both tooth flanks 116 and 118 mutually form a "virtual tooth gap", which is filled somewhat fully by the tooth 48.

FIG. 8 is a plan view of FIG. 7. The region of the tooth flanks 116 and 118 engaging the tooth 48 are indicated by small crosses. If the tooth flanks of the teeth 48 are not of flat or planar shape as shown in FIGS. 7 and 8 but are rather of curved shape somewhat such as shown in FIGS. 4 to 6, obviously no areal contact results between the teeth 48 of the planet gear and the teeth 46 and 74 of the central gears. In such a case, the contact is linear.

If a torque is transmitted between both coupling hubs 42 and 44 during operation of the coupling, the teeth 48 of the planet gear are deformed as a result of the elastic construction thereof in the embodiment of the upper half of FIG. 2, and/or are forced radially outwardly as a result of the elastic mounting or support thereof in the embodiment of the lower half of FIG. 2. A consequence of this elastic displacement possibility of the teeth is that both coupling hubs 42 and 44 are turned with respect to one another through a torsion or torque angle $\rho$. This case is illustrated in FIG. 10.

FIG. 10 is an elevational view of two adjacent central gears 82 and 84 such as, for example, the view of the embodiment of FIG. 1 as seen from the left-hand side thereof on a reduced scale, but without the planet gear 90 and without the ring 47, and the visible part of the teeth 46 being shown with stippling.

Both central gears 82 and 84 disposed behind one another in FIG. 10 are turned with respect to one another through a torque angle $\rho$. The tooth flanks 116 and 118 of the teeth of both central gears mutually form two rows of virtual tooth gaps 50 and 51. The flanks of the larger virtual tooth gap 50 are intersected once in a line 62 which is recognizable as a virtual tooth-gap point or apex 62. All of these virtual tooth-gaps points or apices 62 are located on a "virtual foot circle" 64 having a radius rv.

In addition, a row of smaller virtual tooth gaps 51 are formed, the points or apices of which are disposed on a radius Rv. The radial depth of the tooth gaps 51 is considerably smaller, however, than the radial depth of the tooth gaps 50, so that, of the two tooth gaps 50 and 51 that are formed, practically only the row of virtual tooth gaps 50 with the foot circle rv, which have the greater radial depth, are utilized.

FIG. 9 illustrates the cooperation of the teeth 48 of the planet gear 90 with the virtual tooth gaps 50 of the teeth 46 and 74 of the central gears. In this regard, FIG. 9 shows, in an enlarged view, a detail of the lower half of FIG. 10, wherein additionally, a single tooth 48 of the planet gear and the teeth 46 and 74 of the central gears cooperating therewith are illustrated.

Since the central gears are turned relative to one another, the tooth flank 118 of the front central gear 74 together with the tooth flank 116 of the rear central gear 84 form a virtual tooth gap which is filled out by the tooth 48 of the planet gear. The tooth flank 148 of the planet gear therefore engages the tooth flank 118 of the fronttooth 74, whereas the tooth flank 146 of the tooth 48 engages the tooth flank 116 of the rear tooth 46. In the embodiment of FIG. 9, the point or apex of the tooth 48 is not rounded off, so that the virtual tooth gap point or apex 62 coincides with the point or apex of the tooth 48. If the point or apex of the tooth 48 were rounded off in a conventional manner, this would not have been applicable.

The teeth 46 and 74 act upon the tooth 48 with the forces indicated by the arrows 102 and 104 which are resolved into tangential components 106 and 108, on the one hand, and a radial component 110, on the other hand. It is apparent that the tangential components 106 and 108 cancel one another with the result that no forces act in circumferential direction upon the tooth 48. This is the reason why the teeth 48 need not be fastened to the base member 120 of the planet gear. A result thereof also is that the planet gear 90, in circumferential direction, need transmit no forces and, therefore, if necessary, can have a thin and elastic construction without thereby impairing the durability and efficiency of the coupling for transmitting very high torque. Only the radial force component 110 acts upon the tooth 48 and forces the latter toward the base member 120.

The base member 120 of the planet gear (FIG. 1), which is not shown in FIG. 9, is elastic and presses the teeth 48 in direction of the arrow 114 into the virtual tooth gap. With increasing torque angle $\rho$ (FIG. 10), the intersecting line 62 continuously moves outwardly. The foot-circle radius rv of the virtual tooth gap becomes longer. The teeth 48 are shifted outwardly against the resilient force of the base member 120.

If both coupling halves connect a motor and a machine, a very high torque must be transmitted initially when starting-up the motor, in order to accelerate the machine. If the spring force of the base member 120 is adjusted to suitable softness, the teeth 48 are forced far outwardly, which initially results in a relatively large torque angle $\rho$ of the central gears. The spring force of the base member 120 seeks, however, to force the teeth 48 back in and thereby to reduce the torque angle. In stationary operating condition, the torque angle $\rho$ then again becomes zero or almost zero.

If the spring force of the base member 120 is adjusted so as to be suitably soft, the teeth 48 of the planet gear can be forced so far outwardly that every tooth 48 leaps over into the next virtual tooth gap at a given torque. Due to this leaping or springing of the teeth 48, the torque of the coupling to be transmitted is limited, and the coupling consequently acts as a safety coupling.

If the teeth of the planet gear are not formed as solid teeth, but rather, as in the embodiment of the upper half of FIG. 2, with zig-zag or corrugated metal sheets, the same representation with respect to the radial mobility of the teeth of the planet gear are applicable, an additional elasticity being attained due to the construction of these teeth of zig-zag or corrugated metal sheets.

As shown from the foregoing representation, the elasticity of the coupling according to the invention is effected due to the radial mobility of the teeth of the planet gear, the extent of this mobility being determined by the elasticity of the base member 120, if necessary in cooperation with the corrugated or zig-zag metal sheet. Through this elasticity, a damping of possibly occurring torsional vibrations or rotary impulses is achieved. The damping characteristic is, in this case, dependent upon the number of teeth of the central gears, upon the flank angle of the teeth of the central gears as well as upon the shape of the flanks thereof. Applicable in this regard is that the damping increases with the number of the teeth and, likewise, the damping increases as the flank angle of the teeth of the central gears becomes smaller. A damping characteristic dependent upon the torque angle $\rho$ of the central gears is attained through concave or convex construction of the tooth flanks of the central gears. If concave tooth flanks are selected i.e. flanks that are outwardly arched or cambered in direction of the height of the tooth, the damping of the coupling becomes smaller with increasing torque angle $\rho$, and if, on the other hand, convex tooth flanks are selected i.e. flanks that are inwardly arched or cambered in direction of the height of the tooth, the reverse is then true.

FIG. 11 shows the upper half of FIG. 1 in an elevational view from the left-hand side of the latter, without the ring 47, both central gears having a torque angle which, in contrast to FIG. 1 or 2, is greater than zero. In the interest of clarity, the corrugated or zig-zag metal sheet 80 is provided with hatching although it is not shown in cross section. It is apparent from FIG. 11 that the corrugated or zig-zag metal sheet 80 and the base member 120 are forced radially outwardly. The extent of the outward displacement of the zig-zag metal sheet 80 is given by the difference: rv-r, wherein rv is the radius of that virtual foot circle 64 on which the virtual tooth-gap points or apices are located, whereas r represents the foot-circle radius of the central gears for a torque angle $p=0$.

Faults or defects 122 of the planet gear 90 are apparent in FIG. 11. At these faulty locations 122, the planet gear 90 has no teeth 48. Such a construction is possible if not all the teeth 48 are required for transmission. As is shown at the right-hand side of FIG. 11, to form the faulty location 122, the corrugated or zig-zag metal sheet 80 extends toward the inside of the ring-shaped base member 120 above the virtual tooth gap 50 and forms a tooth 48 only at the next virtual tooth gap 50, one virtual tooth gap 50 thereby remaining free. On the left-hand side of FIG. 11, there is shown a faulty location 122 in a modified embodiment with respect to the zig-zag metal sheet 80. In this regard, the zig-zag metal sheet 80 forms a bend or arch 124 projecting into the virtual tooth gap 50 but, nevertheless, not engaging the tooth flanks of the central gears. Through this construction of the zig-zag metal sheet 80 as an arch or bend 124 in the region of the virtual tooth gap 50, the elasticity of the zig-zag metal sheet 80 is enhanced. As is likewise apparent from FIG. 11, the faulty locations 122 are disposed in regular sequence the spacing between each two faulty locations 122 being six teeth of the planet gear 90.

FIG. 12 shows a coupling similar to that of FIG. 11. Whereas the ring-shaped base member 120 of the planet gear 90 surrounds the zig-zag metal sheet 80, however, in the coupling of FIG. 11, and it is thereby possible to install an open i.e. not closed into a ring, zig-zag metal sheet, the base member 120 is omitted in the embodiment of FIG. 12. For this reason, the zig-zag metal sheet 80, in this case, must be closed on itself and must be relatively strong and, only because of the elastic spring force thereof, forces the inwardly directed points 81 thereof, as teeth 48, into the virtual tooth gaps.

As is further to be derived from FIG. 12, the central gears i.e. the shafts to be coupled, are offset from one another a given offset distance. The foot circle of the virtual tooth gaps remains circular, and the center 58 thereof divides the offset distance nearly exactly in half, as is apparent especially from FIG. 13, which represents in an enlarged diagrammatice view the central region of FIG. 12.

In addition thereto, the offset distance a indicates the spacing between the centers M84 and M82, respectively, of the central gears 84 and 82.

The teeth 46 of the rear central gear 84 are indicated by stippling in FIG. 12, just as in the remaining figures of the drawing, insofar as the teeth 46 are not covered by the teeth 74 of the front central gear 82. It is apparent from FIG. 12 that the teeth 46 are less visible on the left-hand side than on the right-hand side because of the offset distance a. Since the center 58 of the footcircle of the virtual tooth-gap row divided the offset distance a in half, however, only half of the offset distance a is made noticeable at the teeth. Consequently, the planet gear 90, during rotation thereof, in fact, effects a radial displacement, which occurs, however, only over the distance a/2. A result thereof is that also the restoring or return forces, which act upon the bearings of the shafts, are correspondingly reduced, and the oscillation or vibration excitations are cut in half. Sliding occurs at the tooth flanks. For great driving power, the coupling thereby requires grease and oil lubrication which can also serve for cooling.

As is shown in FIG. 10, the tooth flanks 118 form an angle $\alpha$ therebetween. Likewise, the tooth flanks 116 form an equal angle $\alpha$ therebetween. The virtual tooth gap 50, however, is defined, on the one side, by a tooth flank 118 and, on the other side, by a tooth flank 116. These tooth flanks 118 and 116 form a smaller angle $\alpha v$ therebetween. The size of this angle $\alpha v$ fully agrees with that of the angle $\alpha$ if the torque angle $p$ of the central gears is zero. As the torque angle $p$ increases, the size of value of the angle $\alpha v$ diminishes i.e. the virtual tooth gap 50 becomes increasingly pointier or more acute. In order to ensure an areal contact of the teeth of the planet gear that are not shown in FIG. 10, the flank angle of each tooth of the planet gear is, therefore, advantageously variable.

This variability of the flank angle has the result that the bisector of the virtual tooth gap 50 does not extend exactly radially, but rather, with increasing torque angle $p$, deviates ever more sharply from the radial direction.

With a construction of a coupling according to FIG. 14, the aforementioned variations of the flank angle $\alpha$ and/or variation in the location of the bisector of the virtual tooth gap 50 are able to be compensated. In FIG. 14, which is an elevational view of another embodiment of the coupling according to the invention with only part of the planet gear 90 thereof shown, the teeth 48 of the planet gear 90, which are variable both in the flank angle and in the direction of the angle bisector thereof, are clearly illustrated. Furthermore, faulty locations 122 are also present in regular sequence and do not have any teeth 48 of the planet gear thereat. The details of this construction are apparent from FIG. 15 wherein a tooth 48 together with the bearing or mounting therefor is shown in detail and in enlarged view, the base member 120 being also shown with hatching although it is not in section.

The base member 120 of the planet gear is formed with a concave cylindrical surface as a pivot bearing bed 152 of the tooth 48. If the center of curvature of the concave cylindrical surface were coincident or identical with the point or apex 54 of the tooth 48 (disregarding the rounding-off thereof), each pivot or swing of the tooth in direction of the double arrow 150 would effect no change in the height of the tooth. If the center of curvature of the concave cylindrical surface is disposed, however, beyond the point 154, every swing or pivot of the tooth 48 would effect a change in the height thereof. Through suitable selection of the curvature of the concave surface of the base member 120, any desired relationship between the change in height of the tooth 48 and the swinging or pivoting thereof in direction of the double-headed arrow 150 can be attained. Moreover, a dependence between the height of the tooth 48 and the tooth-flank angle thereof is produced.

Due to this possibility of swinging or pivoting, the tooth 48 can be accommodated or matched to variations in the position of the virtual tooth gap. A slot 147 disposed in vicinity of the tooth bisector 155 and extending from the pivot bearing bed 152 almost to the point 154, affords a variation of the flank angle without difficulty. Furthermore, a desired characteristic of the damping of torsional vibrations is able to be attained by suitable selection of the parameters that are available.

FIG. 16 shows another embodiment of the bearing or support for a tooth 168. With respect thereto, the base member 120 of the planet gear is formed with a semi-cylindrical recess 145 wherein a cylindrical spring 156 is disposed which is open at a radially outwardly facing location 158 thereof. The tooth 48 with both flank parts 168 thereof, which are mutually connected at the top thereof (and advantageously of unipartite construction) is seated on the spring 156. The flank parts 168 of the tooth 48 of FIG. 16 terminate at a spaced distance from the base member 120 so that the tooth 48 can pivot or swing, riding to the right or left-hand side on the spring 156. An accomodation or match to the variable tooth-gap bisector of the virtual tooth gap is thereby possible, just as a change of the flank angle. Elastic spring-biasing of the teeth of the planet gear in direction toward the virtual tooth gaps of the central gear is simultaneously attained by the spring or key 156.

FIG. 17 shows another embodiment of the coupling according to the invention in an elevational view and having the possibility of varying the flank angles of the teeth 46, 74 of the central gears. Axial bores 73 are formed in the body of the central gears and are open, for example, through a slit toward the tooth gaps between respective parts of teeth 46 and 74 at 143. The teeth 46 and 74 are consequently connected to the body of the central gears, although only through narrow strips 75. These strips 75 can become somewhat bent during operation so that the respective bisector of the teeth 46, 74 does not extend exactly radially and cannot be accommodated or matched to these teeth of the tooth row of the planet gear 90.

Figure 18:
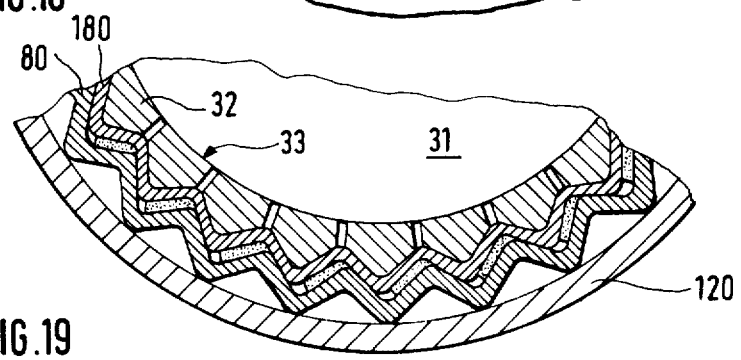
FIG. 18 is a fragmentary sectional view of yet a further embodiment of the coupling wherein the central gears and the planet gear are constructed in the form of zig-zag or corrugated metal sheets.

In FIG. 18, there is provided a cross-sectional view of another embodiment of the coupling according to the invention, as seen in vicinity of a central gear, only the lower part of the coupling being shown. As is apparent from FIG. 18, the central gears have no coupling hubs, but rather, somewhat wedge-shaped elements 33, such as of metal, for example, are disposed on the shafts 31 that are to be coupled, and have inner surfaces 33 smoothly engaging the outer surface of the respective shafts 31. The tooth rows of the central gears are formed by corrugated or zig-zag metal sheets 180. The zig-zag metal sheet 180 is disposed in prestressed condition over the wedge-shaped elements 32 which, for assembly purposed, can be secured by adhesive to the respective shaft 31. The respective central gear formed of the wedge-shaped elements 32 and the zig-zag metal sheet 180 is consequently seated directly on the shaft 31, and a coupling hub is therefore not required with this very simple construction.

In the construction of FIG. 18, both central gears are formed of such generally wedge-shaped elements 32 with a zig-zag metal sheet 180 introduced in prestressed condition. Also, the tooth row of the planet gear is formed by another corrugated or zig-zag metal sheet 80 braced on the ring-shaped base member 120. The zig-zag metal sheet 180 is formed as a closed ring.

Figure 19:
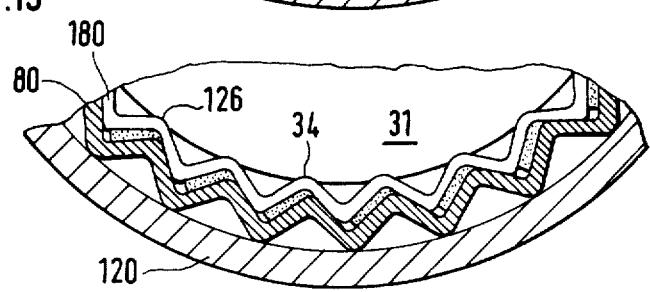
FIG. 19 is a view similar to that of FIG. 18 of an additional embodiment of the coupling.

An embodiment of the invention, in principal of similar construction to that of FIG. 18, is shown in FIG. 19, however, with the generally wedge-shaped elements 32 omitted therefrom. In place thereof, rounded-off notches or depressions 126 are formed in the respective shaft 31, into which there extends the inwardly directed edges or points 34 of the zig-zag metal sheet 180, which forms the respective central gear. These notches 126 must be adequately deep so that, when torque is produced, the zig-zag metal sheet 180 will not be torn out of the notches 126. On the other hand, if the zig-zag metal sheet 180 is permitted to slip out of the notches 126 at a given loading or stress, for example, due to a suitably provided depth of the notches 126, a safety slip coupling or torque overload coupling can be formed in this manner, which separates both coupled shafts when a specific torque is reached.

The construction of FIG. 19 has an advantage over that of FIG. 18 in that the generally wedge-shaped elements 32 of FIG. 18 are dispensed with. On the other hand, it should be emphasized with respect to the construction of FIG. 18 that no machining or other processing of the shaft 31 is required whatsoever therein, because the generally wedge-shaped elements 32 attain the required torque-transmission through a friction lock.

Whereas in the heretofore described embodiments of the invention illustrated in FIGS. 1 to 19, the central gears are externally toothed and the planet gear is internally toothed, the embodiment of FIGS. 20 and 21 have the reverse construction, FIG. 20 being an axial, longitudinal section of the upper part of a coupling according to the invention, and FIG. 21 being a cross sectional view of FIG. 20 taken along the section line XXI—XXI thereof.

According to FIGS. 20 and 21, coupling hubs 142 and 144 or the shafts to be coupled are of hollow construction and are provided at the ends thereof with inwardly directed teeth 274 and 276 which form internally toothed central gears 182 and 184. Within the central gears 182 and 184, an externallyy toothed planet gear 190 is disposed which has a zig-zag metal sheet 80 engaging in the tooth gaps of the central gears. The zig-zag metal sheet 80 is inwardly braced against a ring-shaped base member 220 which, because of the composition thereof, such as of rubber, for example, is elastically deformable. Instead of the zig-zag metal sheet 80, as in the embodiment of FIGS. 1 and 2, individual loosely arranged, solid teeth can also be used for forming the planet gear. Also, the coupling hubs 142 and 144 can have a radially resilient i.e. elastic, construction in order to achieve spring-loading or biasing of the teeth.

To protect against penetration of dirt or dust and to guide the base member 220 axially, rings 247 are inserted into circular grooves formed in the coupling flanges or hubs 142 and 144. The manner of operation of this coupling corresponds to that of the coupling according to the embodiment of FIGS. 1 and 2, with the difference, however, that the base member 220 is resiliently pressed by the teeth of the planet gear not radially outwardly, but rather, radially inwardly. Obviously all of the modifications described in connection with the embodiments of FIGS. 1 to 19 are employable as well with a coupling such as that of FIGS. 20 and 21.

Figure 22:
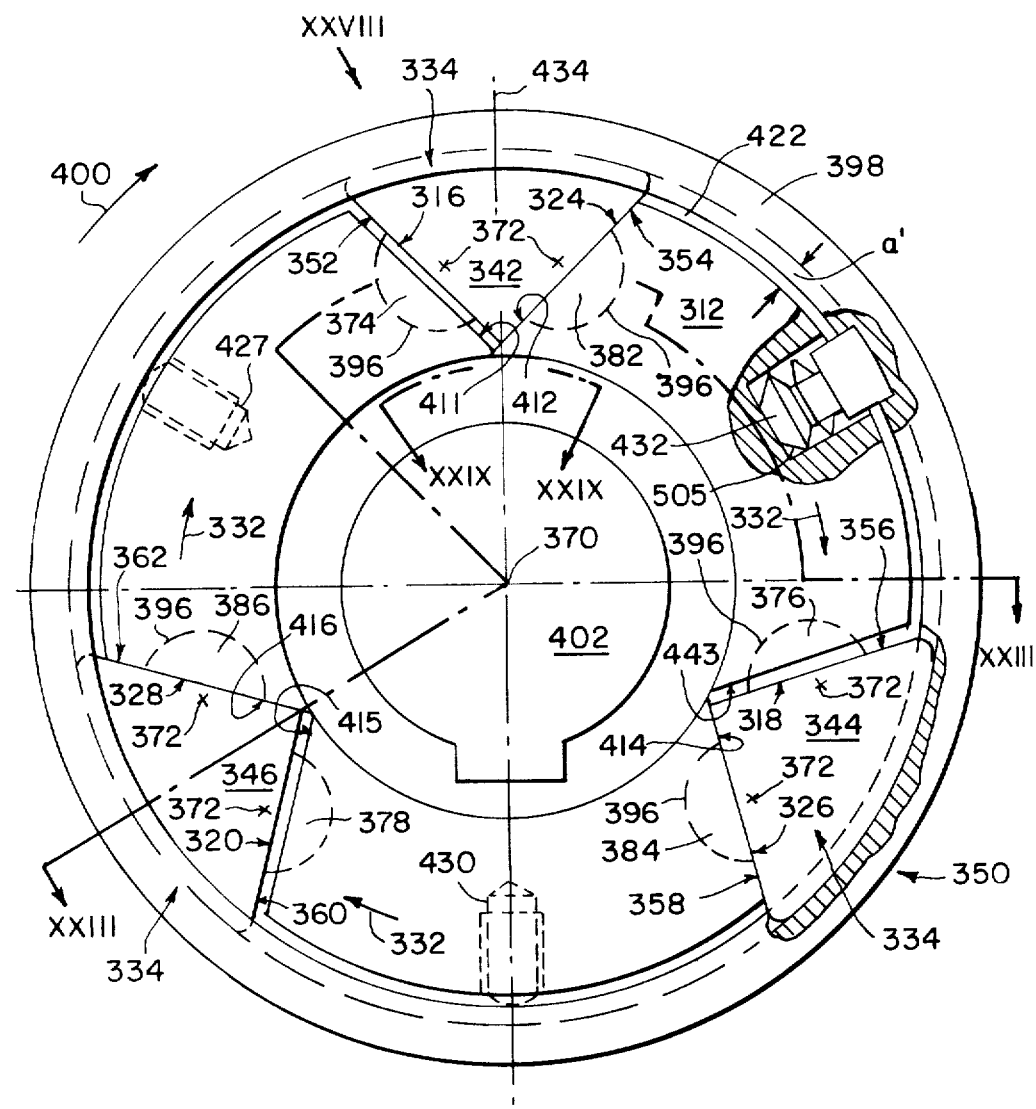
FIG. 22 is a diagrammatic end view, partly in section, of a coupling according to the invention which is not turned by any torque.
Figure 23:
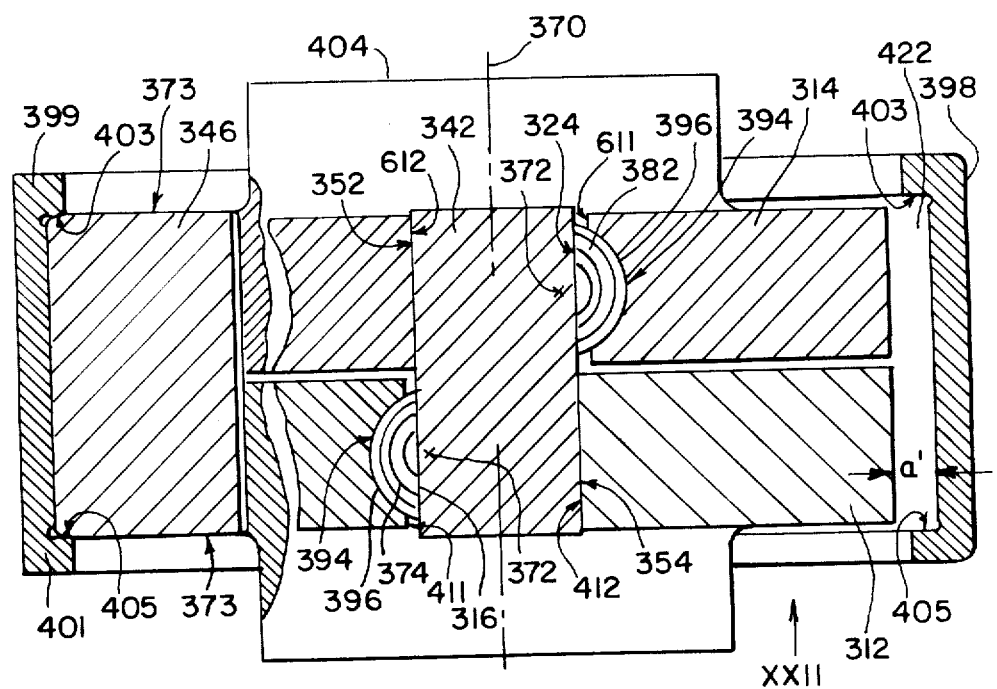
FIG. 23 is a sectional view of FIG. 22 taken along the line XXIII—XXIII in direction of the arrows.

FIG. 22 shows a coupling according to the invention, wherein both coupling halves are not turned relative to one another by any torque i.e. are not subjected to stress or loading. FIG. 23 is a cross-sectional view of FIG. 22 taken along the line XXIII—XXIII. The arrow XXII in FIG. 23 indicates the viewing direction of FIG. 22.

Of the two coupling halves 312 and 314 shown in FIG. 23, only the front i.e. bottom in FIG. 2, coupling half 312 is visible in FIG. 22. This front coupling 312 is formed with a central bore 402 while the rear i.e. top in FIG. 2, coupling half 314 has a central bore 404. The bore 402 is for receiving a drive shaft, and the bore 404 for receiving a driven shaft. As is apparent from FIG. 22, the respective non-illustrated shafts are secured against relative rotation with the respective front and rear coupling halves 312 and 314 by non-illustrated adjusting keys. Each of the coupling halves 312 and 314 is formed with a circular coupling disc and a central hub.

The front coupling half 312 visible in FIG. 22 carries three hollow spherical bearing bushings 396 distributed about the periphery thereof at equal angles from one another and which are disposed in planes perpendicular to the plane of the drawing of FIG. 1. Three spherical-segment shaped, such as hemispherical, for example, compensating members 374, 376 and 378 are supported in the three hollow spherical bearing bushings 396. The three compensating members 374, 376 and 378 are, respectively, formed with a planar inclined surface 316, 318 and 320 extending at an angle transversely to the force-transmission direction. In FIG. 23, the hollow spherical bearing bushing 96, the compensating member 74 as well as the respective planar inclined surface 315 are visible in section in the front coupling half 312. In the interest of simplifying the disclosure, reference will be made herein to "hemispherical" compensating members. However, these compensating members 374, 376 and 378 need not be constructed exactly as "half" spheres as shown in the drawing. The compensating members 374, 376 and 378 may also be smaller or, if desired or necessary, larger than hemispheres; what is essential, however, is that they bear with a spherical surface in the hollow spherical bearing bushing 396 and are therefore universally pivotable or swingable in all directions.

In the same manner, though oppositely oriented, the rear coupling half 314, carries compensating members 382, 384 and 386 formed with respective inclined surfaces 324, 326 and 328, in hollow spherical bearing bushings 396.

A respective slide member 342, 344, 346 is disposed between the inclined surfaces 316, 318, 320 of the front coupling half 321 and the inclined surfaces 324, 326, 328 of the rear coupling half 314. The manner of this disposition is apparent especially from FIG. 23. The slide members 342, 344 and 346 extend in axial direction over both coupling halves 312 and 314.

The following are disposed respectively pairwise opposite one another in accordance with FIG. 22;

(a.) the planar inclined surfaces 316 and 324 of the compensating members 374 and 382, which are supported in the hollow spherical bearing bushings 96 of the front coupling half 312 and the rear coupling half 314, so that the surfaces 316 and 324 are disposed opposite and offset from one another (note FIG. 23), (b.) the planar inclined surfaces 318 and 326 of the compensating members 376 and 384, which are supported in the hollow spherical bearing bushings 96 of the front coupling half 312 and the rear coupling half 314, as well as (c.) the planar inclined surfaces 320 and 328 of the compensating members 378 and 386, which are supported in the hollow spherical bearing bushings 96 of the front coupling half 312 and the rear coupling half 314.

Figure 32:
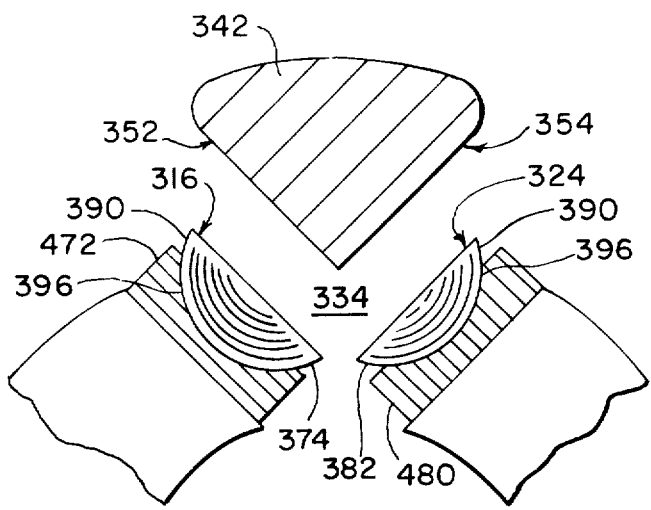
FIG. 32 is a sectional view of FIG. 31 taken along the line XXXII—XXXII in direction of the arrows wherein the slide member is shown shifted out of the gap or intermediate space.

A planar inclined surface of the front coupling half 312 and a planar inclined surface of the rear coupling half 14, respectively, define therebetween a radially outwardly opening intermediate space or gap 334 (note FIG. 32). A slide member in the form of a slide wedge 42, 44, 46 is disposed, respectively, in each intermediate space 334. Each slide member 342, 344 and 346, respectively, is formed with respective planar guide surfaces 352, 354 and 356, 358 and 360, 362 which engage a respective planar inclined surface of one of the six compensating members 374, 376, 378, 382, 384 and 386. The cross sections of the slide members are triangular.

The three slide members 342, 344 and 346 are held by a surrounding holding ring 98 in the illustrated position of FIG. 23 and act, in a manner similar to that for the elastic shaft coupling of the hereinaforementioned German Published Non-Prosecuted Application (DE-OS) 27 42 442, like the teeth of a planet gear surrounding two central gears (comparable to the coupling halves 312 and 314). The holding ring 98 surrounds the coupling halves but is spaced therefrom a distance a so as to form an annular gap 122.

If the front coupling half 312, which is connected against relative rotation with the non-illustrated drive shaft, rotates in direction of the arrow 400, the planar inclined surface 316, 318 and 320 press against the planar slide surfaces 352, 356 and 360 of the three slide members 342, 344 and 346. A force component thereby acts in radial direction outwardly upon the slide members. The latter are braced outwardly against the holding ring 398 and transmit the torque to the planar inclined surfaces 324, 326 and 328 of the three compensating members 382, 384 and 386, which are supported in the hollow spherical bearing bushings 96 of the rear coupling half 314. With this transmission of the torque, the individual, substantially wedge-shaped slide members 342, 344 and 346 are stressed in compression and shear. To prevent the holding ring 398 from canting or twisting between the two coupling halves 312 and 314 upon the occurrence of this shear stress, the holding ring 398 is formed at the interior thereof with two peripheral guidance beads 399 and 401. The slide members are disposed between radially inwardly extending, mutually facing guidance surfaces 403 and 405 formed on the guidance beads 399 and 401, respectively, and can shift in peripheral direction, but not in axial direction, however. (note the slide member 346 at the left-hand side of FIG. 23).

Each of the coupling halves 312 and 314 is formed in the respective coupling disc portions thereof with three V-shaped recesses which are uniformly distributed about the periphery thereof, as shown in FIG. 22. These V-shaped recesses serve to receive the wedge-shaped slide members 342, 344 and 346 therein. In this regard, each of the V-shaped recesses of the front coupling half 312 is bounded by a V-surface 411, 413, 415 and an opposing surface 412, 414, 416; both surfaces intersecting, respectively, at the base of the recess. The rear coupling half 314 has corresponding V-shaped recesses. In FIG. 23, the V-surface 611 and the opposing surface 612 of the rear coupling half 314 are shown. A hollow spherical bearing bushing 396 is disposed in each V-surface of both coupling halves 312 and 314. Each of the opposing counter surfaces 412, 414, 416, 612 is coordinated in inclination with the inclination of the slide surface of the slide member associated therewith. In the "unstressed setting" of FIG. 22, wherein the coupling is not stressed by any torque, the three slide members 342, 344 and 346 have the respective two planar slide surfaces 352, 354, 356, 358, 360, 362 thereof in engagement with, respectively, one planar inclined surface 316, 318, 320 and, respectively, one counter surface 412, 414, 416 of the front coupling half 312. The equivalent applies also to the rear coupling half 314 (note FIG. 23).

Figure 28:
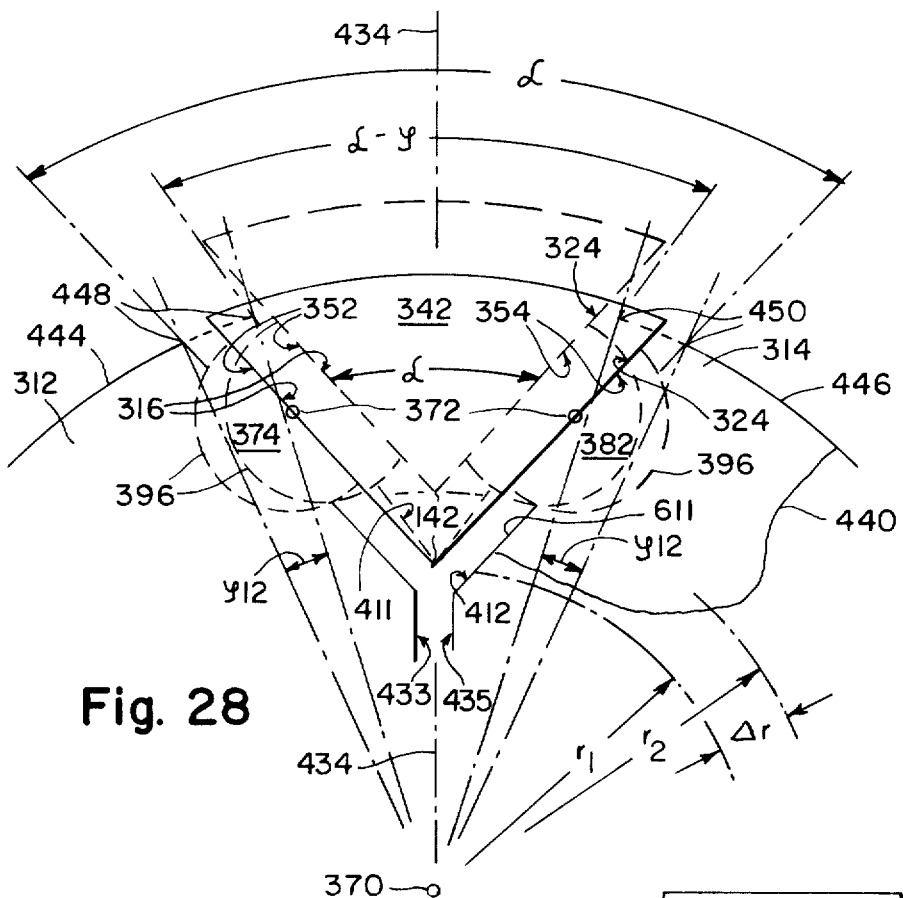
FIG. 28 is an enlarged fragmentary view of either FIG. 22 or FIG. 26 as well as a sectional view of FIG. 27 taken along the line XXVIII—XXVIII in direction of the arrows for explaining the course of movement of the coupling.

According to FIGS. 22 and 23, three hollow spherical bearing bushings 96 are provided in each coupling half 312 and 314 and have a respective compensating member 334 mounted therein so as to be turnable about a pivot point 372 (note FIG. 28). The compensating member 334 is constructed, respectively, in the shape of a spherical segment or spherical calotte with a surface 94 of rotation concentric with the pivot point 372 and supported in a hollow spherical bearing bushing 396 (note FIG. 23) also concentric with the pivot point 372. The compensating member 334 is therefore pivotable in all directions. Since the compensating members 334 supported in the hollow spherical bearing bushings 96 are generally of lower height than hemispheres, the pivot point 372 is usually located in the interior of the slide member, as is shown in FIGS. 22 and 23.

The construction of the compensating member 334 as a spherical segment permits the use of the coupling according to the invention also when the axis 370 of the coupling in the region of the drive shaft forms an angle with the axis 370 of the coupling in the region of the driven shaft. The pivotability in the compensating members permits the compensation of such an angular displacement or dislocation.

According to FIGS. 22 and 23, the planar inclined surface of the coupling halves 312 and 314 are disposed on turnable compensating members which are mounted or supported in hollow spherical bearing bushings 96 of the V-surfaces. Other dispositions or arrangements of the compensating members are represented in FIGS. 24 and 25 which show embodiments similar to that of FIG. 23 but wherein, however, only the region about the slide member 342 is illustrated.

Figures 24, 25:
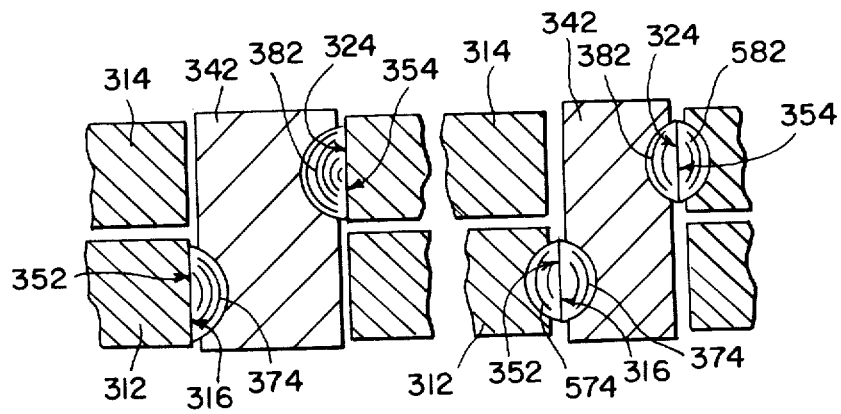
FIGS. 24 and 25 are fragmentary views of FIG. 23 showing different pivot bearings of compensating members in respective coupling halves and/or slide members.

According to FIGS. 24 and 25, it is possible to disposed the planar slide surfaces of the three slide members on pivotal compensating members which are supported in hollow spherical bearing bushings located in the slide bushing. FIG. 24 shows such an embodiment wherein the compensating members 374, 382, which are held in the slide member 342, are seated in hollow spherical bearing bushings. The corresponding planar inclined surfaces 316 and 324 of the coupling halves 312 and 314 are directly applied, in this case, to the coupling halves 312 and 314. It is not necessary, in this case, to construct the slide members 342, 344, 346, 348 in the form of slide wedges with triangular cross sections. The shape of the slide members is optional, it being essential only that the compensating members be held by the slide members in the correct position or setting. In most cases, the slide members would be given a wedge-shaped construction here anyway because this is the simplest construction form.

FIG. 25 shows another embodiment. In constrast to the aforedescribed embodiment of FIG. 24, the planar inclined surfaces 316, 324 of the two coupling halves 312, 314 of FIG. 25 are disposed or arranged on further compensating members 574 and 582 which are likewise of substantially hemispherical construction and are pivotably disposed in bearing bushings of the coupling halves, as clearly shown in FIG. 25. The disposition or arrangement represented in FIG. 25 provides the advantage of greater pivotability.

Figure 26:
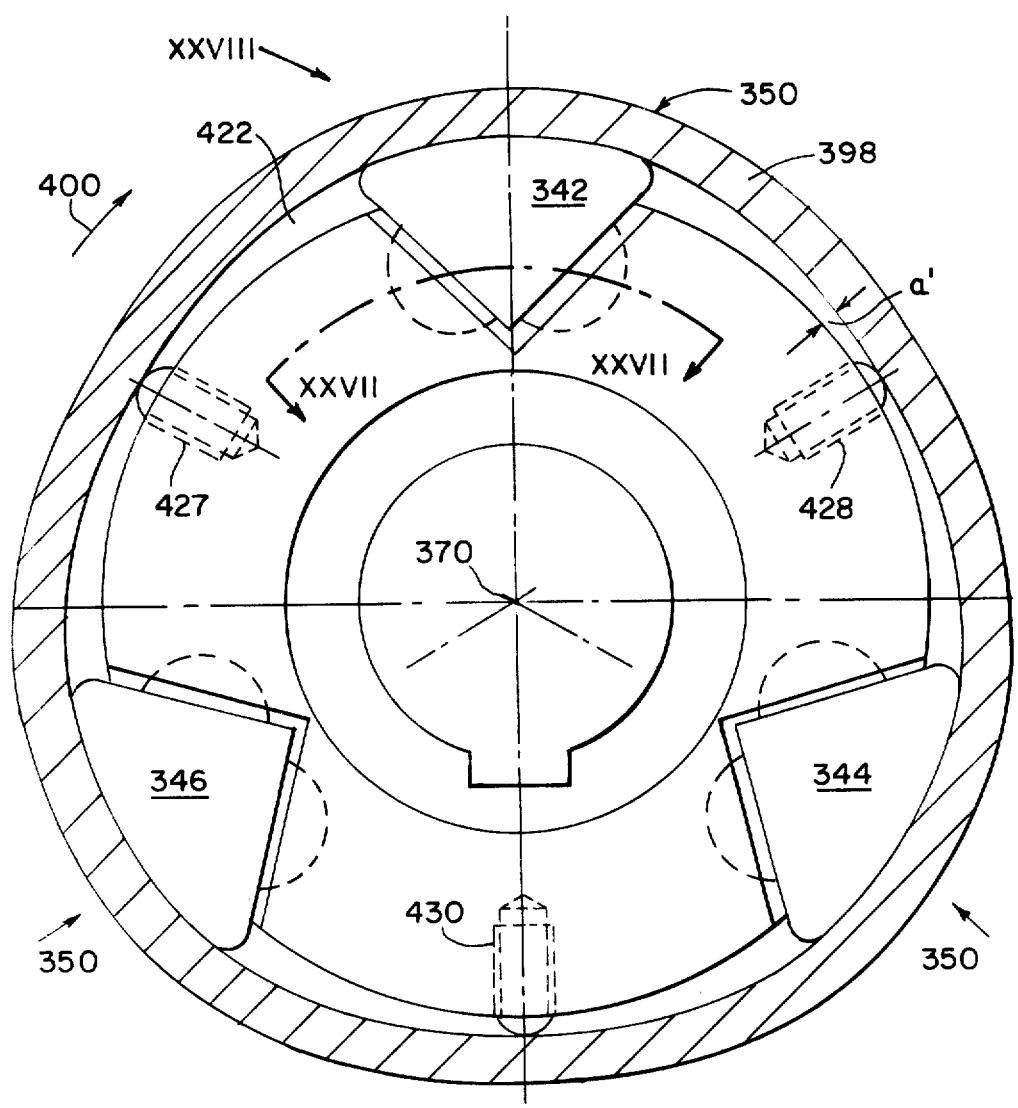
FIG. 26 is another view similar to that of FIG. 22, except for the holding ring being in cross section, showing the respective coupling halves turned relative to one another due to a torque loading.

If the coupling represented in FIG. 22 transmits a torque from the front coupling half 312 to the rear coupling half 314, the three slide members 342, 344 and 346 are then forced radially outwardly against the surrounding holding ring 398. Thus, a non-circular deformation of the holding ring 398 is effected thereby, as shown in FIG. 26. The contact surfaces of the three slide members 342, 344 and 346 at the holding ring 398 (which is shown in section and without the guidance beads 399, 401) act as a radially resilient or springy bearing 350. The three slide members 342, 344 and 346, according to FIG. 26, are forced radially outwardly against this radial resilience or springiness, which is due to the noncircular deformation of the holding ring 398, the planar slide surfaces of the respective slide members 342, 344 and 346 sliding on the planar inclined surfaces of the two coupling halves in engagement therewith.

Figure 27:
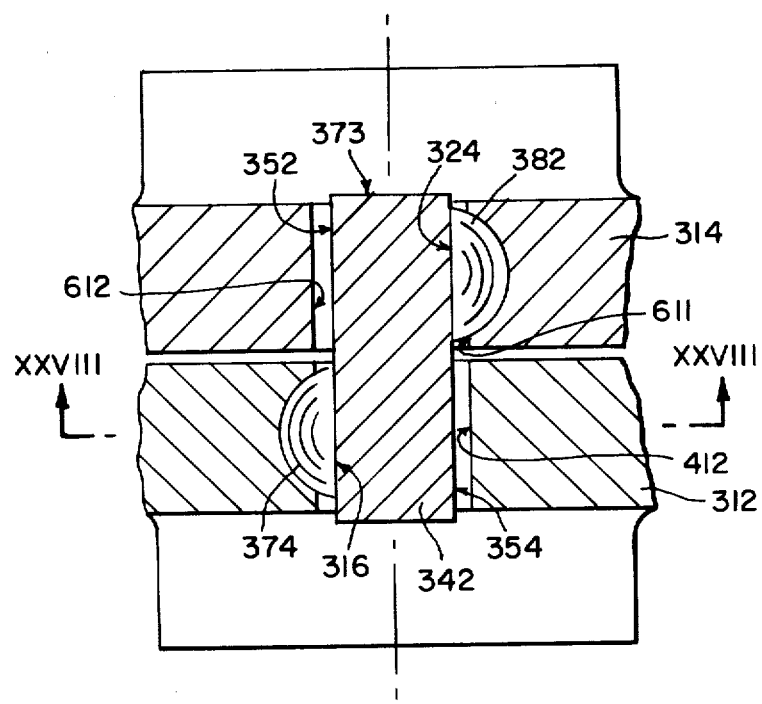
FIG. 27 is a sectional view of FIG. 26 taken along the line XXVII—XXVII in direction of the arrows.

The sectional view of FIG. 27 taken along the line XXVII—XXVII in FIG. 26 is similar to that of FIG. 23. A difference therein, however, is that the planar slide surfaces 352 and 354 of the radially outwardly forced slide member 342 are lifted away from the respective opposing surface 612 and 412. In this stressed position or setting, the front half of the planar slide surface 352 of the slide member 342 engages the planar inclined surface 316 of the compensating member 374 of the front coupling half 312, whereas the rear half of the planar slide surface 354 of the slide member 342 engages the planar inclines surface 324 of the compensating member 382 of the rear coupling half 314. These two halves of the planar slide surfaces 342 and 354, which are thus acted upon, are thus offset or shifted relative to one another so that the slide members are stressed in shear. It has been mentioned hereinbefore, that peripheral guidance beads 399 and 401 are provided on the holding ring 398 to prevent canting of the three slide members between the coupling halves. In this regard, the end faces 373 of the slide members are guided on the guidance surfaces 403 and 405 (FIG. 23).

The holding ring 398 elastically deforms until it engages the coupling discs in the three regions between the three slide members. The torque causing this engagement is adjustable if adjustable or spring-loaded stops or abutments are provided, respectively, between the three slide members. In accordance with FIGS. 22 and 26, these adjustable stops are constructed as radial screws 427, 428, 430 or (right-hand upper quadrant of FIG. 22) as bolts or pins 432, which are disposed at the periphery of at least one of the coupling halves, the pins or bolts 432 being acted upon by springs, such as cup springs 505, in radially outward direction. The damping characteristic curve of the elastic shaft coupling according to the invention can be adjusted by adjusting the screws or by suitable selection of the springs before the holding ring 398 is slipped on. By the choice of elasticity of the holding ring 398, the damping characteristic can also be affected additionally or solely. Naturally, only one type of stops or abutments, either screws 427, 428, 430 or spring-loaded pins 432 would be used for a particular coupling.

From a comparison of FIGS. 22 and 26, it is apparent that the elastic deformation of the holding ring 398 ensures a radial shifting or dislocation of the three slide members 342, 344 and 346. To explain the pivoting or swinging movements of the compensating member which occur due to this radial shifting of a slide member, there is shown in FIG. 28, a detail XXVIII of FIGS. 22 and 26, as well as a much-enlarged cross-sectional view of FIG. 27 taken along the line XXVIII-—XXVIII. In FIG. 28, the parts shown in solid lines relate to the unstressed setting or position of FIG. 22, while those in broken lines to the stressed setting of FIG. 26. Furthermore, in the right-hand half of FIG. 28, part of the front coupling half 312 is shown broken away along a line 440. Only a short portion of the opposing or counter surface 412 of the front coupling half 312 is thereby visible; the line connected thereto represents the V-surface 611 of the V-shaped recess formed in the rear coupling half 314. The hollow spherical bearing bushing 396, wherein the spherical-segment shaped compensating member 382 is pivotally supported, is provided in this V-surface 611.

The V-surface 411 of the front coupling half 312 has the hollow spherical bearing bushing 396 wherein the compensating member 374 is pivotally supported.

The V-surfaces 411 and 611 wherein, respectively, compensating members are pivotally supported, mutually include an angle $\alpha$.

The planar slide surfaces 352 and 354 of the wedge-shaped slide member 342 mutually include the same angle $\alpha$ which is included by the V-surfaces 411 and 611 of the coupling halves 312 and 314. In the solid-line position of FIG. 28, which corresponds to the setting of FIG. 22 which is unstressed by any torque, the planar inclined surfaces 316 and 324 of the compensating members 374 and 382 also mutually include this angle $\alpha$.

In the torque loading or stressing of the elastic shaft coupling according to the invention, as has been discribed hereinbefore, the slide member 342 is forced radially outwardly against the elastic force of the surrounding holding ring 398, not shown in FIG. 21. In this setting or position, it is shown in broken lines in FIG. 28. This broken-line stressed or loaded position, just as the solid-line unstressed position, is illustrated symmetrically to the radial plane, although this radial plane, during the application of the torque, has already described a rotary movement which may consist of several revolutions about the coupling axis. The illustration of FIG. 28, however, affords gainful clarity by showing the unstressed position and the stressed position symmetrical to a single radial plane 434 which is disposed perpendicularly to the plane of the drawing and is represented as a line.

The planar slide surfaces 352 and 354, after application of a torque, mutually include the angle $\alpha$, unchanged, because the slide member 342, in itself, is non-deformable. Since the slide member 342 maintains the position thereof symmetrical to the radial plane 434, an angular displacement or turning of the two coupling halves relative to one another through an angle $\rho$ is effected;

(1.) a swing or pivoting of the V-surface 411 of the front coupling half 312 about an angle $\rho/2$;

(2.) a swing of pivoting of the V-surface 611 of the rear coupling half 314 about an angle $\rho/2$.

Both of these pivot angles $\rho/2$ occur, respectively, toward the right-hand and the left-hand side, as viewed in FIG. 28. Since this concerns swinging or pivoting, the V-surfaces 411 and 611 are not shifted in parallel, but rather, are pivoted also in relationship to one another, so that the angle included thereby reduces from $\alpha$ to $\alpha - \rho$. This angle $\alpha - \rho$ is shown at the top of FIG. 28.

Should the planar slide surfaces 352 and 354 (according to the heretofore known state of the art) directly engage the V-surfaces 411 and 611, no areal contact of the planar slide surfaces 352 and 354 would be afforded any longer with the V-surface 411 and 611 due to angular displacement or twisting of the two coupling halves about the angle $\rho$. For this reason, the compensating members 374 and 382 are provided in accordance with the invention and are pivoted in the hollow spherical bearing bushings 396 in such a manner that the planar inclined surfaces 316 and 324 thereof, in every position of the slide member 342, completely areally engage the planar guide surfaces 352 and 354 thereof. In the illustrated embodiment of FIG. 28, the planar inclined surfaces 316 and 324 are pivoted about an angle $\rho/2$.

In FIG. 28, the case is illustrated wherein both compensating members are supported in highly spherical bearing bushings 396. The pivot point 372 lies exactly in the planar slide surface 52 or 54, respectively. In general, it will be preferred, however, to make the compensating member flatter i.e. not hemispherical, so that the pivot point 372 comes to lie within the slide member 342.

Both coupling halves 312, 314 may be formed with mutually opposing radial surfaces 433, 435 which extend from V-surfaces and/or counter surfaces radially and opposite one another axially inwardly. If these radial surfaces engage one another, the maximal possible torsion angle $\rho$ is attained. For a yet torque loading or stress, the coupling acts as a rigid, inelastic coupling, without the occurrence of any danger of damage or overload.

Figure 29:
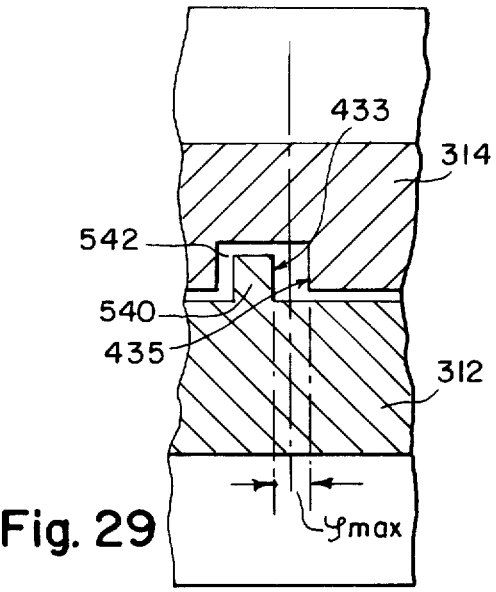
FIG. 29 is a sectional view of FIG. 1 taken along the line XXIX—XXIX in direction of the arrows.

An embodiment providing such a limitation of the torsion angle $\rho$ is illustrated in FIG. 29 which represents a cross-sectional view of FIG. 22 taken along the line XXIX—XXIX. In accordance therewith, an axial projection 540 is provided on the front coupling half 312 and has a radial surface 433. This projection 540 engages in a depression 542 formed in the rear coupling half 314 and having a radial surface 435. The construction is such that, for an unstressed coupling, both radial surfaces 433, 435 are disposed opposite one another with a spacing therebetween. In the event of an applied stress or loading i.e. upon angular displacement or twisting of both coupling halves relative to one another, both radial surfaces 433 and 435 approach one another and, for a maximal torsion angle $\rho_{max}$, engage one another. The coupling then acts as a rigid coupling and the radial surfaces 433, 435 define the elastic range of the coupling. The projection 540 may be formed, if desired, from a screwed-in bolt and the depression 542 by a bore. It is also advantageous if several radial surfaces 433, 435 are distributed about the periphery.

With the radial shifting or displacement of the slide member 342, as shown in FIG. 28, the inner point or apex 442 of the slide member 342 moves from the radial distance $\gamma$, to the radius $\gamma_2$. The width a of the annular gap 422 between the outer periphery 444, 446 of the coupling discs, on the one hand, and the non-illustrated holding ring 398, on the other hand, then varies by difference: $\gamma_2 - \gamma_1 = \Delta\gamma$. In the region of the slide member, the width a of the annular gap 422 increases by this value $\Delta\gamma$, whereas a reduction in the width of the annular gap 422 occurs at the three intermediate points of the outer periphery 444, 446. The screws 427, 428, 430 and the pin 432, respectively, of FIGS. 22 and 26 are adjusted in such manner that the damping characteristic curve of the coupling maintains the desired course or trend; from that instant at which the holding ring 398 engages the stops 427, 428, 430, 432, this characteristic curve becomes steeper (note FIG. 26).

FIGS. 30 to 33 show an elastic shaft coupling according to the invention which differs from that of FIGS. 22 and 26 in that it is constructed as a jaw or claw coupling.

Figure 30:
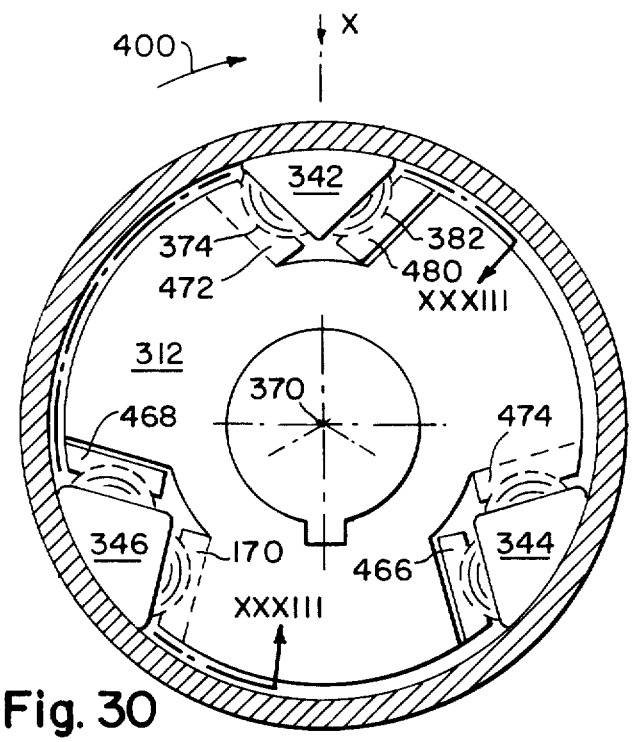
FIG. 30 is another view, reduced in size, similar to that of FIG. 22, except for the holding ring being in cross section, of another embodiment of the coupling which is not turned by any torque and is constructed as a jaw or claw coupling.
Figure 31:
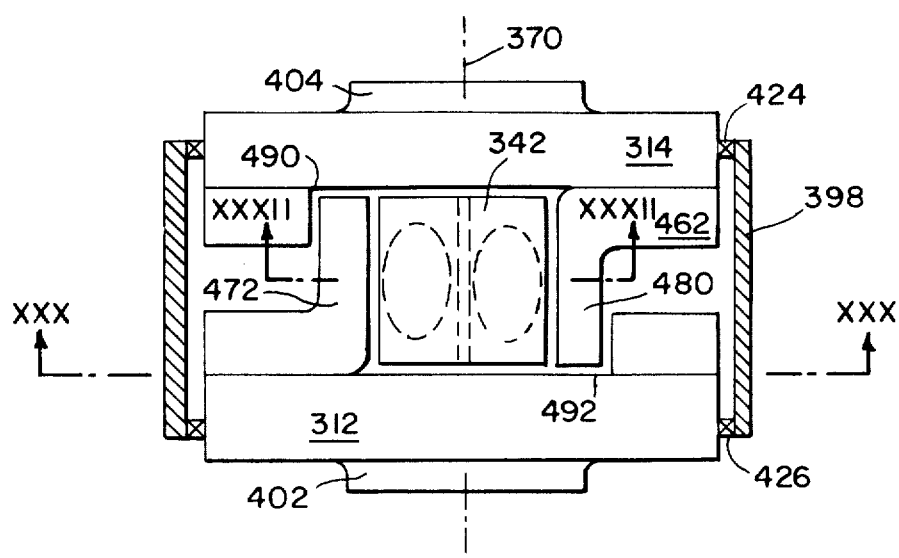
FIG. 31 is a cross-sectional view of FIG. 30 with a split holding ring.
Figure 33:
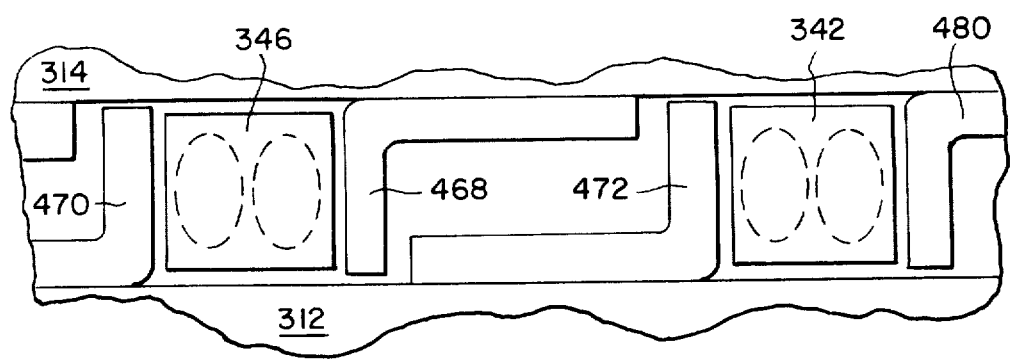
FIG. 33 is a projected or unwound view, as seen radially from the outside, of the two coupling halves of FIG. 30, taken along the section line XXXIII—XXXIII therein.

FIG. 30 is a view corresponding to that of FIG. 22 and, more exactly, is a cross-sectional view of FIG. 31 taken along the line XXX—XXX. FIG. 31 is a view in direction of the arrow X of FIG. 30, with the upper half of the holding ring 398 omitted. Furthermore, FIG. 32 is a diagrammatic sectional view of FIG. 31 taken along the line XXXII—XXXII, and FIG. 33 is an enlarged projection or unrolled view of FIG. 31. Elastic seals 425, 426 are shown in FIG. 31, disposed between the holding ring 398 and the coupling halves 312 and 314.

From FIG. 30 and the projection of FIG. 33, it is apparent that the rear coupling half 314 carries three equiangularly distributed jaws or claws 466 (not visible in FIG. 33), 468 and 480, which project perpendicularly from the plane of the coupling half 314 and extend nearly up to the front coupling half 312.

The front coupling half 312, in turn, carries three equiangularly distributed jaws or claws 470, 472 and 474 which project perpendicularly from the front coupling half 312 and extend nearly up to the rear coupling half 314. The mutually facing surfaces (a) of the jaws 472, 480, (b) of the jaws 474, 466 as well as (c) of the jaws 470, 468 correspond to the V-surfaces 411, 413, 415 and 611 discussed hereinbefore with respect to FIGS. 22 to 29 and carry, in hollow spherical bearing bushings, the compensating members which are pivotable about a pivot point. These compensating members carry planar inclined surfaces which, in a manner similar to that in FIGS. 22 to 29, engage planar slide surfaces of the slide members 342, 344 and 346 which are constructed as slide wedges with a triangular cross section.

Just as for the embodiments of the coupling shown in FIGS. 22 to 29, a torque acts to displace or shift the slide members 342, 344 and 346 outwardly. However, no shear forces are thereby applied to these slide members 342, 344 and 346, because the mutually facing V-surfaces of the jaws, which have the hollow spherical bearing bushings, are located directly opposite one another and brace or support the planar slide surfaces of the slide members over the entire axial extent thereof. This construction of the elastic shaft coupling according to the invention as a jaw coupling renders the use of the guidance bead 399, 401 on the holding ring 398 superfluous and permits the transmission of especially high torque because compensating members with larger surfaces can be used.

The compensation members of FIGS. 30 to 33 are spherical segments or calottes, which is especially well apparent from FIG. 32 wherein a slide member 342 with both planar slide surfaces 352 and 354 thereof is shown. Parallel to both of these planar slide surfaces, the planar inclined surfaces 316 and 324 of the spherical-segment shaped compensation members 374 and 382 are disposed, which are pivotally supported in hollow spherical bearing bushings 396 of the jaws 472 and 480.

In order to be able to show separately the slide surfaces 352 and 354, on the one hand, and the planar inclined surfaces 316 and 324, on the other hand, the slide member 342 is represented somewhat radially outwardly shifted or offset in FIG. 32; in actual operation of the coupling, such a setting or position naturally never occurs because the holding ring 398 always presses the slide member radially inwardly.

Figure 34:
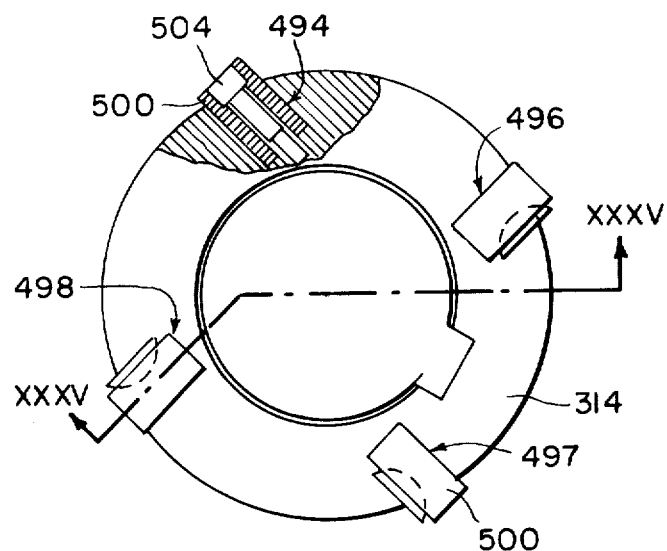
FIG. 34 is an end view, partly broken away and in section, of a coupling half carrying four compensating members on special insert parts, which are received in slots formed in the coupling half.
Figure 35:
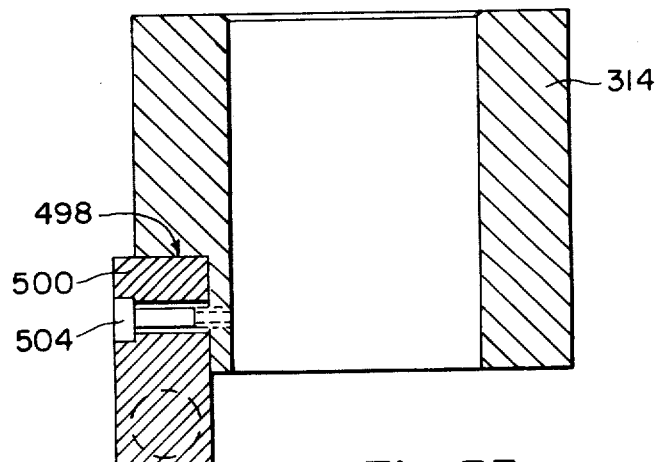
FIG. 35 is a cross-sectional view of FIG. 34 taken along the line XXXV—XXXV in direction of the arrows, with parts located behind the cross-sectional plane being omitted.

According to FIGS. 30 to 33, the jaw coupling is constructed in a conventional manner in that the angular jaws are welded or screwed at the long leg thereof to the respective coupling disc, while they project with the short leg thereof into the space between the coupling halves. In the construction of FIGS. 34 and 35, the long leg is superfluous.

FIG. 34 shows a view of a rear coupling half 314 in axial direction, from the drive shaft in direction toward the driven shaft. The front coupling half associated therewith is constructed in accordance with the construction of the rear coupling half 314.

According to FIG. 35, equiangularly distributed, axially extending slots 494, 496, 497 and 498 are provided in the coupling half 314. Insert members 500 are received in these slots. The insert members 500 are oriented similarly to the jaws of the jaw coupling according to FIGS. 30 to 33; the orientation of the slots 444, 496, 497 and 498 are thereby established. After the insertion of the insert members 500 into the associated slots, they can be locked in by means of locking screws 504 which are disposed in bores extending from the interior of the coupling half 314 up to the respective slot. The insert members 200 carry the spherical-segment shaped compensation members in hollow spherical bearing bushings, just as the jaws of the jaw coupling shown in FIGS. 30 to 33. The advantage of the device of FIGS. 34 and 35 over the jaw coupling of FIGS. 30 to 33 resides in the relatively easier manufacture and uncomplicated assembly thereof. In FIG. 35, parts which are located behind the sectional plane have not been shown. The insert members 200 are of parallelepipedal construction.

Figure 36:
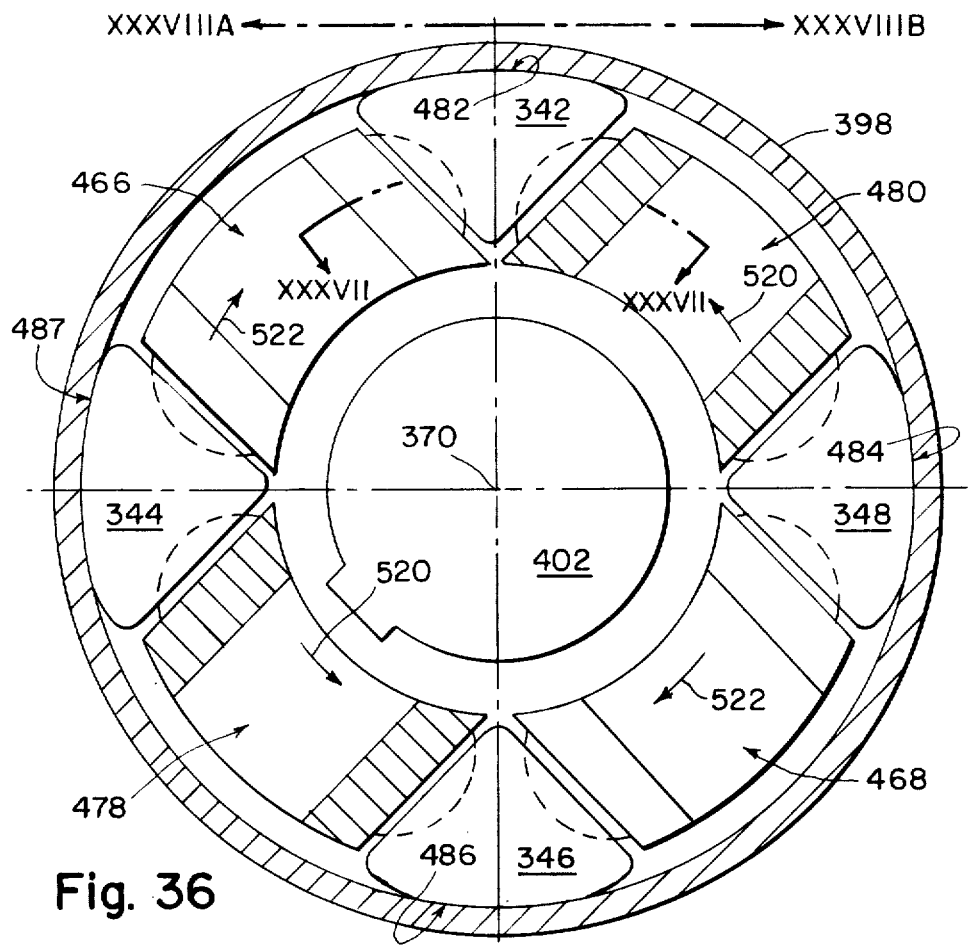
FIG. 36 is a cross-sectional view of another embodiment of the coupling according to the invention which is constructed as a jaw or claw coupling with four gaps or intermediate spaces and is not turned by any torque.

FIG. 36 is a sectional view of another jaw coupling according to the invention, which differs from the jaw coupling shown in FIG. 30 in that four slide members are provided instead of only three slide members. The sectional view of FIG. 36 is taken along the line XXXVI—XXXVI in FIG. 37.

Figure 37:
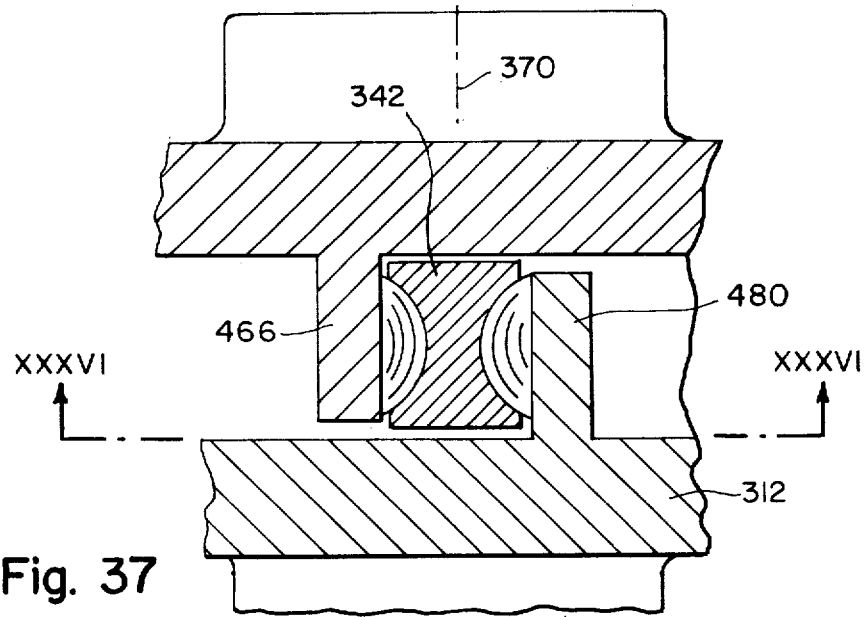
FIG. 37 is a sectional view of FIG. 36 taken along the line XXXVII—XXXVII in direction of the arrows.

FIG. 37 is a sectional view of FIG. 36 taken along the line XXXVII—XXXVII.

Figure 38:
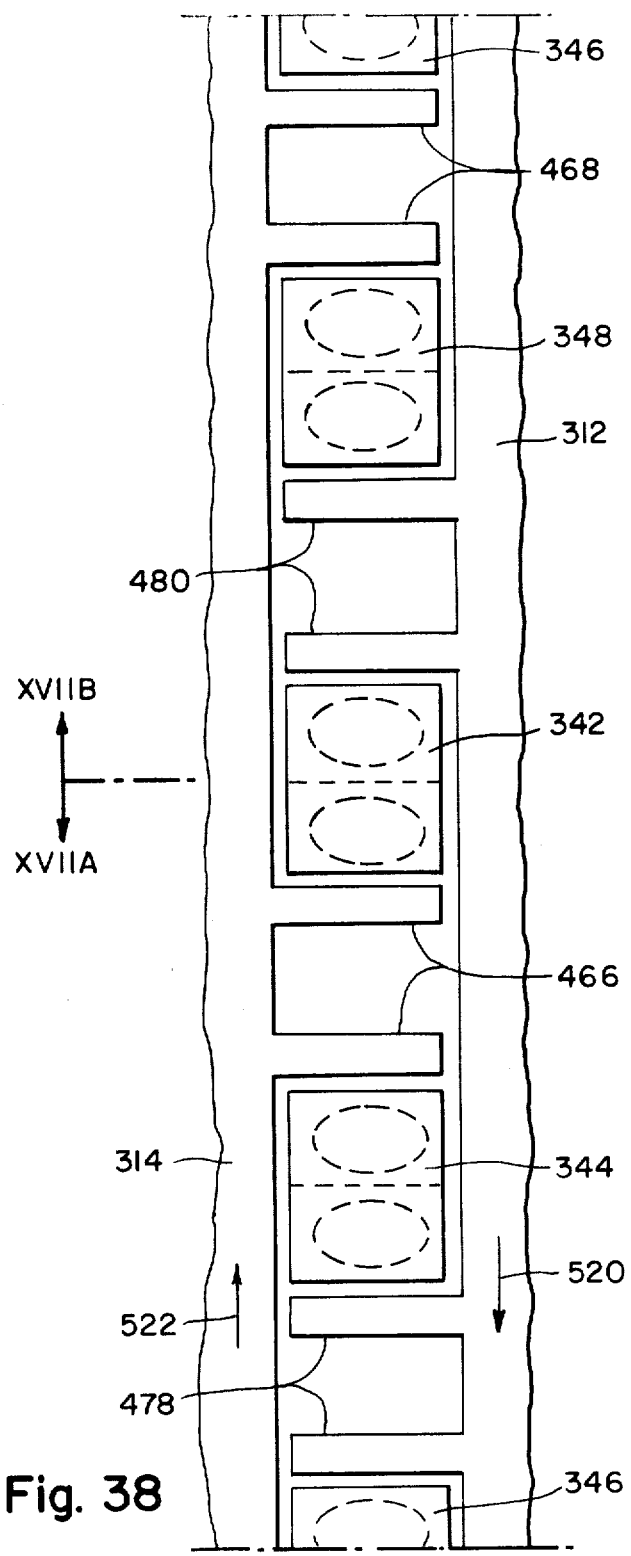
FIG. 38 is an enlarged, complete projected view of both coupling halves of FIG. 36 as seen radially from the outside.

Furthermore, FIG. 38 is a developed or unwound view similar to that of FIG. 33, but extending, however, over the entire periphery of both coupling halves, without showing the surrounding holding ring 398. The length of the projection in FIG. 38 is thereby not according to scale.

FIGS. 36, 37 and 38 show the jaw coupling in a setting or position thereof wherein no torque effects any mutual twisting or torsion of the coupling halves.

Figure 39:
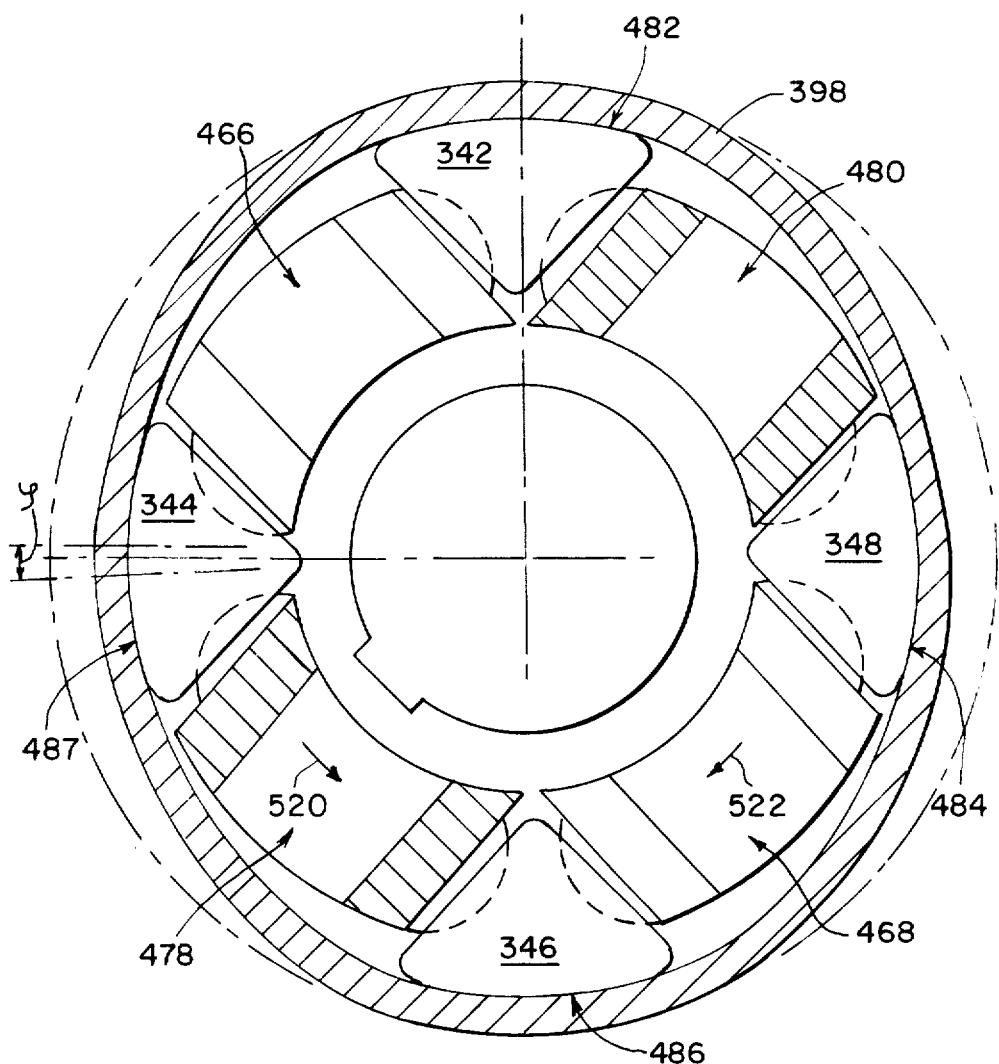
FIG. 39 is another view of FIG. 36 wherein the coupling halves are turned relative to one another by a torque loading.

FIG. 39 is a cross-sectional view corresponding to that of FIG. 36, however, with an angular shift or displacement of the coupling halves relative to one another through a torsion angle $\rho$.

FIG. 36 indicates by the legend XXXVIIIA—XXXVIIIB, the association of the lower half of FIG. 38 to the peripheral part of the coupling at the left-hand side of FIG. 36, and of the upper half of FIG. 38 to the peripheral part of the coupling at the right-hand side of FIG. 36.

The arrangement of an even number of slide members permits the disposition alternatingly of two planar inclined surfaces on a jaw of the one coupling half and two planar inclined surfaces on a jaw of the other coupling half, whereas it was possible, in the arrangement of FIGS. 30 to 33, to dispose alternatingly only one planar inclined surface on a jaw of the one coupling half and only one planar inclined surface on a jaw of the other coupling half.

According to FIG. 38, both jaws 466, 468 are applied to the rear coupling half 314 and both jaws 478, 480 to the front coupling half 312. The arrangement is then that, (1.) the slide member 342 lies between the jaws 466 and 480, (2.) the slide member 348 lies between the jaws 480 and 468, (3.) the slide member 346 lies between the jaws 468 and 478, (4.) the slide member 344 lies between the jaws 478 and 466 (note FIGS. 36 and 38).

If a torque acts upon the drive shaft and thereby upon the front coupling half 312, both coupling halves 312 and 314 are angularly displaced or twisted relative to one another in direction of the arrows 520 and 522 of FIG. 38. This causes:

(1.) an approach toward one another of the jaws 466 and 480, (2.) an increase in the gap or spacing between the jaws 480 and 468, (3.) an approach toward one another of the jaws 468 and 478, as well as (4.) an increase in the spacing between the jaws 478 and 466.

The effects of these reductions and increases, respectively, in the spacings between the four jaws upon the four slide members are apparent in FIG. 39:

(a.) The slide members 342 and 346 disposed diametrically opposite one another are shifted radially outwardly, noncircularly deforming the holding ring 398.

(b.) The noncircularly deforming holding ring shifts the other two oppositely disposed slide members 344 and 348 radially inwardly; this radially inward shift is possible due to the increase in the spacing of the associated jaws.

The jaw couplings shown in FIGS. 22 to 30 act dampingly only in one rotary direction but are, however, rigid and inelastic in the other rotary direction. The construction of FIGS. 36 to 39 acts dampingly in both rotary directions due to the fact that, at the locations of the holding ring 398 disposed between two outwardly pressing slide members (342 and 346 in FIG. 39), the locations of the holding ring 398 being accordingly displaced radially inwardly, further slide members (344 and 348 in FIG. 39) are arranged which are correspondingly shiftable radially inwardly. The holding ring is thereby reliably and playfree clamped in every position between both outwardly moving slide members (342 and 346 in FIG. 39), on the one hand, and both inwardly moving slide members (344 and 348 in FIG. 39), on the other hand.

If the direction of the arrows 520 and 522 (FIG. 38) is reversed, this means a reversal in the direction of the torque. Then, both slide members 344 and 348 are forced radially outwardly and, accordingly, both of the other slide members 342 and 346 are forced radially inwardly. Since the coupling of FIGS. 36 to 30 has no play, this reversal in the torque is effected without the occurrence of the so-called "velocity shock" or "velocity jolt" i.e. without any lifting of the slide surfaces away from the inclined surfaces. As is apparent from FIG. 38, the jaws in the instant embodiment are formed, respectively, of pairwise projections of the coupling halves. The jaws may be angularly formed, however, as in FIGS. 30 to 33. The slide members are formed of slide wedges with a triangular cross section and are equiangularly distributed about the periphery.

In the noncircular deformation of the holding ring due to the outwardly shifted slide members (slide members 342, 344 and 346 in FIGS. 22 to 26; slide members 342 and 346 in FIGS. 36 to 39), the radius of curvature of the holding ring 398, in the pressure positions wherein the slide members apply pressure thereon from within, is reduced. If the radius of curvature of the outer contact surfaces 482, 484, 486 and 487 of the slide members 342, 348, 346 and 344 of FIG. 36 corresponds with the radius of curvature of the unstressed or nonloaded holding ring 398, these contact surfaces of the slide members thus remain lying, in the loaded or stressed position, only in two lateral marginal regions on the holding ring; a hollow space is formed in the middle of the slide members between the holding ring 398 and the respective slide member. This is accompanied by the danger that, between the edges or margins of the contact surfaces of the slide members and the holding ring, a high pressure per unit area occurs which can cause wear.

In the jaw coupling according to FIGS. 36 to 39, wherein only two slide members are shifted radially outwardly, the change in the radius of curvature of the holding ring 398, in the pressure positions, is much greater than for the theretoforedescribed constructions which have three pressure positions.

For this reason, only in the embodiment of FIGS. 36 to 39, are the dadii of curvature of the contact surfaces 482, 484, 486 and 487 selected so that in the loaded or stressed position of FIG. 39 (maximally purported torsion angle ρ), in the pressure positions, the radii of curvature of the contact surfaces of the slide members 342 and 346, markedly coincide with the radius of curvature of the holding ring 398 in the pressure positions. In these pressure positions wherein the greatest radial forces are transmitted, an areal contact between the contact surfaces 482, 486, and the inner surface of the holding ring is thus assured which presents a corresponding or identical radius of curvature in the case of the maximal torsion angle ρ. Correspondingly smaller is the force-transmitting surface between the slide members and the holding ring, on the one hand, in rest position (FIG. 36) and, on the other hand, in the regions lying between the pressure positions where the slide members 344 and 348 engage the flatly deformed holding ring 398 under load.

In order to be able to influence the characteristic curve of the coupling, radially projecting screws or spring-loaded pins may be applied to the jaws (note the screws and pins 427, 428, 430, 432, respectively, in FIG. 22.

FIGS. 40 to 43 show an arrangement of a pair of flat needle-bearing cages between an inclined surface and a slide surface, respectively.

FIG. 40 shows the slide member 342 only, having the hollow spherical bearing bushings 396 with the concentric surfaces 394 of rotation wherein the compensating members 374, 382 are pivotally supported. In FIG. 41, the slide member and the planar slide surface 354 are shown in plan view.

According to FIG. 42, the planar slide surface 354 of the compensating member 382 is located opposite the planar inclined surface 324. According to FIG. 42, these surfaces do not, however, directly engage one another, but rather, a needle-bearing cage 506 is disposed therebetween. In FIG. 43, this needle-bearing cage is shown in plan view. It is apparent therefrom that the axes of the individual rollers 524, 526, 528, 530 and 532 of the needle-bearing cage 506, lie in the plane of the mutually opposing slide and inclined surfaces, respectively, and are oriented so that they are disposed perpendicularly to the direction of the axis 370 of the coupling. This arrangement of the needle-bearing cage 506 has the following sense:

If the drive shaft and the driven shaft, which are connected to one another by the coupling according to the invention, has a greater angle offset or shift, which means, if the axes of the coupling halves intersect, the coupling halves thus shift with respect to one another in axial direction during the rotation thereof. This shaft occurs between the mutually engaging planar slide surfaces and inclined surfaces. Under certain conditions, the shifts involve several millimeters. The disposition of a needle-bearing cage, in accordance with the invention, between the slide surfaces and the inclined surfaces reduces the force effects (longitudinal forces, transverse forces) on the shaft and facilitates the shifting of the coupling halves to one another.

If a radial shift or offset of the shafts are to be compensated by means of a needle-bearing cage disposed between the slide and the inclined surfaces, this needle-bearing cage is angularly displaces through 90° with respect to the arrangement of FIG. 43. It can then compensate for radial shifting of the shafts relative to one another, which occur during rotation and, if desired or necessary, can also facilitate the radial movement of the slide members.

The embodiments shown in FIGS. 22 to 43 are of couplings wherein the intermediate spaces or gaps 334 widen radially outwardly and wherein the slide members disposed in the intermediate spaces or gaps are braced against an outer holding ring 398. Within the scope of the inventive concept, a reverse arrangement is also possible, however, i.e. the intermediate spaces or gaps widen radially inwardly and the slide members disposed in the intermediate spaces or gaps are braced against a holding ring disposed inside the coupling.

Figure 44:
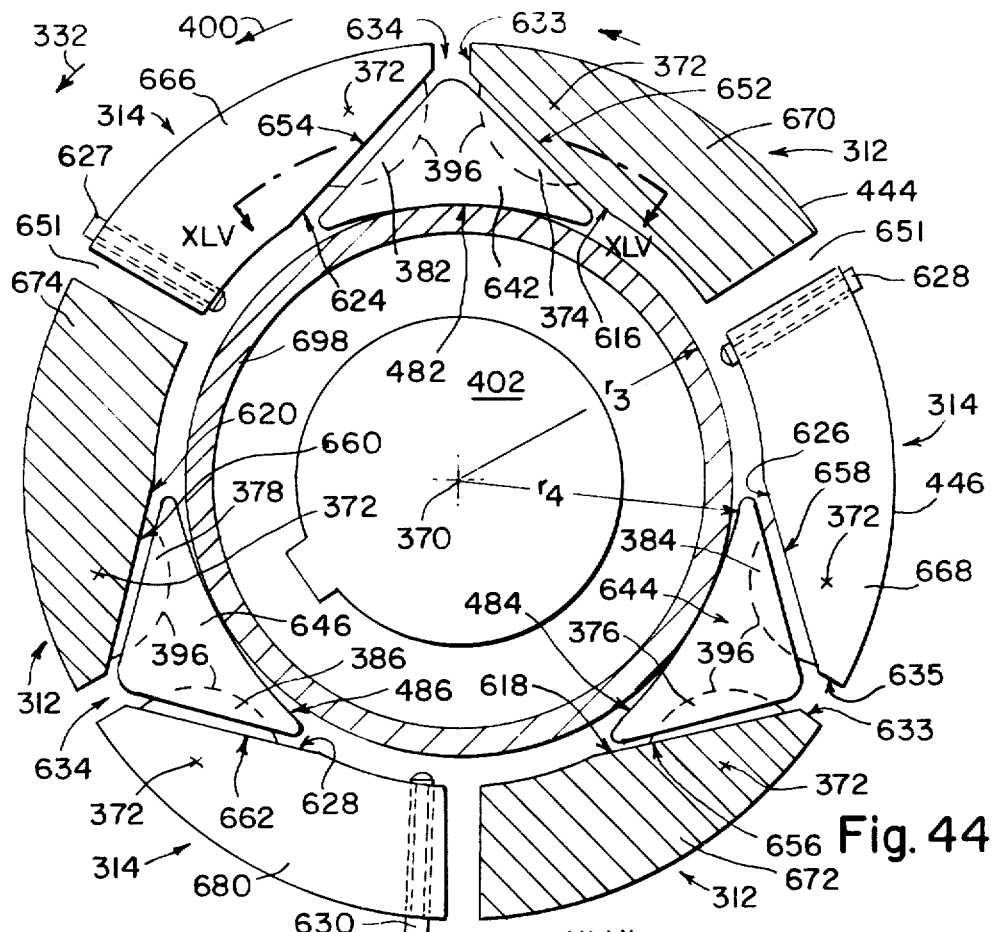
FIG. 44 is a cross-sectional view of a further embodiment of the coupling with an internal holding ring and in non-stressed or non-loaded condition.
Figure 45:
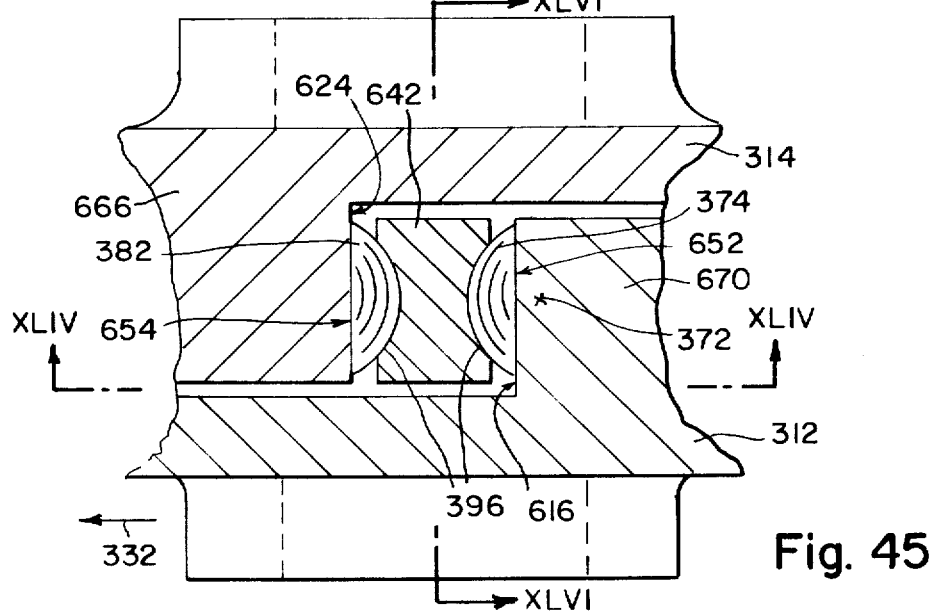
FIG. 45 is a sectional view of FIG. 44 taken along the line XXXXV—XXXXV in direction of the arrows.
Figure 46:
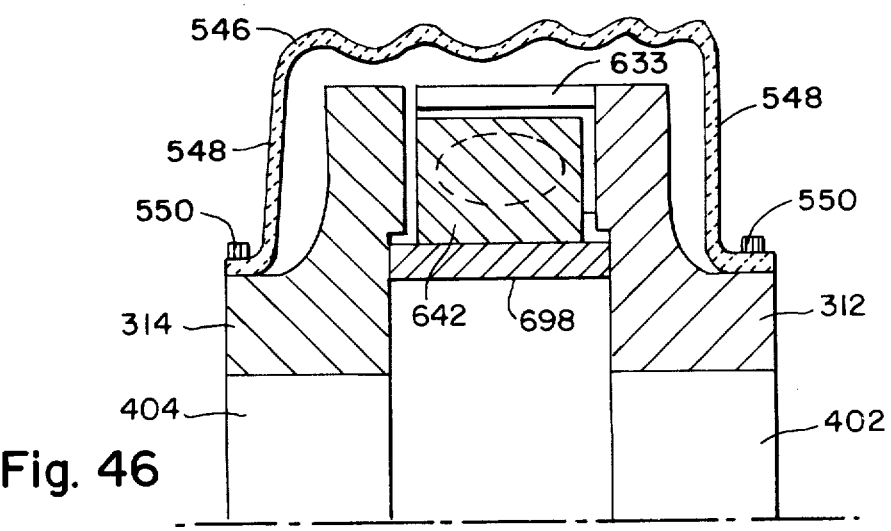
FIG. 46 is a sectional view of FIG. 45 taken along the line XXXXVI—XXXXVI in direction of the arrows.

An embodiment of such a coupling is shown in FIGS. 44 to 46.

As is apparent especially from the vertical sectional view of FIG. 44 (taken along the section line XLIV—XLIV in FIG. 44), the front coupling half 312 is provided on the circular coupling disc thereof with three jaws 670, 672, 674 distributed uniformly about the periphery thereof, which project axially and, between the jaws, gaps or spaces remain free. Corresponding jaws 666, 668, 680 of the rear coupling shaft 314 engage in these gaps or spaces. Mutually opposing, force-transmitting regions of the jaws widen inwardly in radial direction, form intermediate spaces 634 and have planar inclined surfaces 616, 618, 620 of the front coupling halves 312 and planar inclined surfaces 624, 626 and 628 of the rear coupling half 314, as shown quite clearly in FIG. 44. These inclined surfaces do not extend, however, to the outer periphery 444, 446 of the coupling halves, but rather, merge into radial surfaces 633 and 635 which oppose one another with peripheral spacing and which serve for limiting the elastic range of the coupling. The radial length of the radial surfaces 633, 635 is, respectively, about ¼ to 1/5 the radial thickness of the jaws.

As is further shown in FIG. 44, the jaws are constructed in the form of circular-ring sectors. Thereby, between those regions of the jaws which have no inclined surfaces, a radially extending gap 651 is respectively disposed, the width of which is approximately equal to the peripheral spacing of the radial surfaces 633 and 635.

In the intermediate spaces 634, the slide members 642, 644 and 646 are disposed, the cross section of which may be somewhat triangularly constructed. In peripherally adjacent surfaces of each of these slide members, respective hollow spherical bearing bushings 396 are provided wherein, respectively, spherical-segment shaped, for example, hemispherical, compensating members 374, 376, 378, 382, 384, 386 are supported so as to be pivotable in all directions. The compensating members 374, 376, 378, respectively, have a planar slide surface 652, 656 and 660 which engages a respective planar inclined surface 616, 618 and 620. The compensation members 382, 384, 386 oriented in periphery-opposing direction have a planar slide surface 654, 658 and 662, respectively, which engages a planar inclined surface 624, 626, and 628, respectively. The compensating members project so far out of the slide members that, during the pivoting movement of the compensating member, contact between the jaws and the slide members is excluded.

An elastically deformable, annular cylindrical holding ring 698 is disposed within the jaws and forms the radially resilient bearing for the slide members. The slide members 642, 644 and 646 with a triangular side brace against this holding ring 698, the outer diameter of the holding ring 698 being so chosen that, for an unstressed or nonloaded coupling, the slide members are forced in such manner into the intermediate spaces 634, that the slide surfaces engage the inclined surfaces.

The radii $\gamma_4$ of the contact surfaces 482, 484, 486 with which the slide members 642, 644 646 engage the holding ring 698, when the coupling is unstressed or nonloaded, are respectively greater than the outer radius $\gamma_3$ of the holding ring. Coincidence of these radii $\gamma_3$, $\gamma_4$ exists only, for a loaded or stressed coupling, in the region of the sliding members, with which the holding ring 698 is elastically deformed (note FIG. 46). In this way, the areal pressure between the holding ring and the slide members is relatively small in the loaded or stressed condition.

The holding ring 698 is guided in axial direction between both coupling discs, as is clearly apparent from FIG. 46. In order to adjust the damping characteristic of the coupling embodiment under discussion, a radially extending screw 627, 628 and 680 (and/or 670, 672, 674, respectively) in the region between the slide members in the vicinity of the gaps 651. These screws 627, 628, 630 project in radial direction into the interior space of the coupling and form thus a stop or abutment for the holding ring at the elastic deformation thereof. By adjusting the screws, the characteristic curve of the coupling can be influenced. Instead of the screws, spring-loaded pins can also be used.

Figure 47:
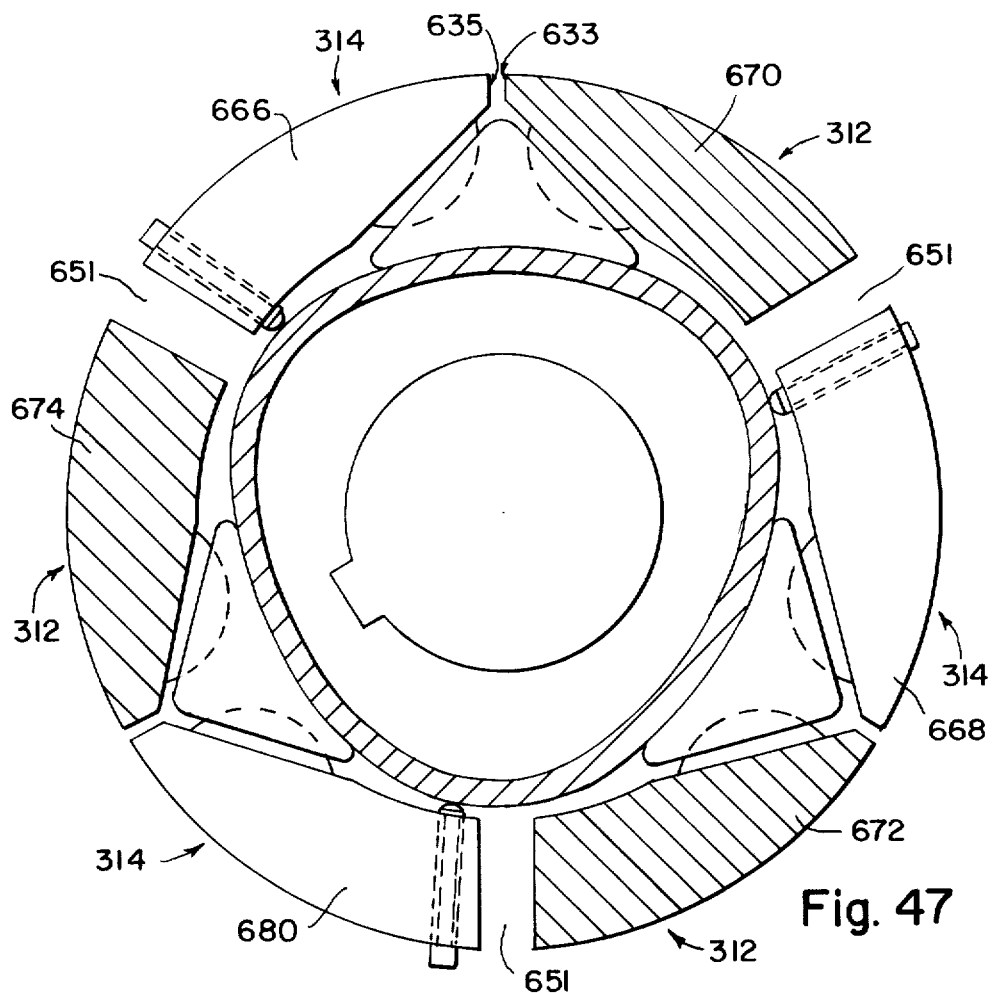
FIG. 47 is another view of FIG. 44 in loaded or stressed condition thereof.

If a torque is transmitted, during operation, from the front coupling half 312 in direction of the arrow 332 to the rear coupling half 314, the slide members 642, 644, 646 are forced inwardly against the elastic resistance of the holding ring 698, the holding ring becoming elastically deformed (note FIG. 47). The peripheral spacing between the jaws 666 and 670 or 668 and 672 or 680 and 674, respectively, thereby becomes smaller, whereas the peripheral spacing between the jaws 670 and 668 or 672 and 680 or 674 and 666, respectively, increases, i.e. both coupling halves are angularly shifted or twisted relative to one another. The twisting or angular displacement can proceed until the radial surfaces 633 and 635 contact one another. The coupling then becomes rotationally rigid.

In the foregoing embodiment, the compensating members are supported in the slide members, and the planar slide surfaces are constructed on the compensating members. In this case, it is unnecessary that the slide members, respectively, have a triangular profile.

What is essential only is that each sliding member have an adequate contact surface at the holding ring as well as an adequate possible bearing for the spherical-segment shaped, for example, hemispherical, compensating members. In the interest of simplification, the slide members will generally be constructed with a triangular profile.

Instead of arranging the compensating members in the slide members, they can also be provided in the jaws. The slide members are then provided with the planar slide surfaces. Also, an arrangement according to FIG. 25 is possible wherein both the slide members as well as the jaws are provided with compensating members.

Also, couplings with a construction according to FIGS. 22 to 43 can be provided with an inner holding ring, if the construction of the construction of the intermediate spaces 334 is changed in accordance with the preceding representations.

In FIG. 46, a possibility is also shown as to how the inner space of ahe coupling can be sealed to keep out dust and dirt form the slide surface and inclined surfaces. In this regard, both coupling halves 312, 314 are surrounded by an annularly cylindrical bellows 546 of an elastic material such as rubber of synthetic material. At the ends, this bellows 546 has radially extending flanges 548 which are fastened, respectively, by a clamping ring 550 to the hub of the coupling. This type of sealing can also be used for the other aforedescribed embodiments of the coupling according to the invention.

For dimensioning the couplings according to the invention, the following standards or approximations apply:

The size of the slide surfaces and, therwith, the size of the hemispherical compensating members is determined by the torque to be transmitted and by the permissible areal or surface pressure between the slide surfaces and the inclined surfaces. If the slide surfaces and the inclined surfaces are formed of hardened steel, a surface pressure up to 10,000 kp/cm$^2$ is the premissible. The thickness of the coupling discs and the axial length, respectively, of the jaws is selected so that the bearing bushings 396 for the compensating members can be machined therein. The same applies also for a bearing or support of the compensating members in the slide members.

The cross sections of the sliding members are selected so that sufficient shear strength and pressure strength, respectively, is provided. The number of the slide members is determined in accordance with the respective application of the coupling. Thus, the greatest possible number of slide members will be used for the construction of a compact coupling of high transmission capacity; the same applies also to couplings which must compensate for a large angular offset of shift or shaft offset or displacement.

The aperture angle of the inclined surfaces of the intermediate space, coordinated one with another, is to be selected, for an unstressed or nonloaded coupling, so that a radial displacement of the slide members is possible for a mutual twisting or angular shifting of both coupling halves. By the choice of this aperture angle, the elasticity of the coupling can be influenced. For a small aperture angle (about 30°), the elasticity of the coupling is slight, for a large aperture angle (about 130°), the elasticity is very great. For the conventional requirements of machine construction, a mean aperture angle between 60° and 90° is sufficient.

The holding rings are preferably formed of steel with a wall thickness which affords the required elastic deformation. If necessary, a holding ring can be constructed also of several rings of various diameters. In this regard, the rings are telescoped i.e. slipped within one another concentrically, tightly or loosely.

There are claimed:

1. In an elastic coupling with two similar central gears assemblable on respective shaft ends and having rows of teeth, respectively, disposed adjacent one another, and a planet gear with a row of teeth having an angular pitch equal to that of the rows of teeth of the central gears and engaging in tooth gaps of the central gears, the central gears being turnable elastically resiliently so that the flanks of the teeth of the central gears form generally wedge-shaped virtual tooth gaps having a profile varying with reciprocal turning of the central gears, the improvement therein which comprises the teeth of the central gear having flanks with planar surfaces, the teeth of the planet gear being rigid individual slide members, and being slidable in radial direction on the planar tooth flanks of the teeth of the central gears during load variation, and the planet gear containing spring means effective in radial direction, for spring-biasing the individual teeth of the planet gear radially into the appertaining tooth gaps.

2. Coupling according to claim 1 including an elastic base member carrying the teeth of said planet gear for radially biasing said planet gear resiliently.

3. Coupling according to claim 1 wherein, for effecting radial resilient biasing, the teeth of said planet gear are of radially resilient construction.

4. Coupling according to claim 1 wherein, for effecting radial resilient biasing, the teeth of said central gears are of radially resilient construction.

5. Coupling according to claim 1 wherein, for effecting radial resilient bearing, said central gears have respective base members of radially resilient construction.

6. Coupling according to claim 1 wherein said tooth flanks of the teeth of said two central gears have convex surfaces in direction of the width of the teeth thereof.

7. Coupling according to claim 1 wherein said central gears have respective coupling hubs for coupling said central gears to the respective shaft ends, at least one of said central gears being constructed as a zig-zag metal sheet connected to the respective hub against rotation relative thereto.

8. Coupling according to claim 1 wherein at least one of said central gears is constructed as a zig-zag metal sheet connectible directly to the respective shaft end against rotation relative thereto.

9. Coupling according to claim 1 wherein the tooth row of said planet gear is constructed as a zig-zag metal sheet.

10. Coupling according to claim 9 wherein said zig-zag metal sheet is ring-shaped and closed on itself.

11. Coupling according to claim 1 wherein the teeth of the tooth row of said planet gear are pivotable for accommodating the respective teeth at the virtual tooth gaps.

12. Coupling according to claim 11 wherein the teeth of the tooth row of said planet gear are, respectively, formed of two flank parts articulatingly connected to one another at the apex of the respective teeth, spring means disposed between said two flank parts for biasing said two flank parts away from one another, said planet gear having a base member supporting said spring means, said two flank parts terminating at respective locations spaced from said base member of said planet gear.

13. Coupling according to claim 1 wherein at least one of said central gears has a base member and the teeth of said at least one of said central gears have respective feet connected by only a relatively narrow, yieldable strip to said base member of said central gear.

14. Coupling according to claim 1 wherein said central gears are externally toothed, said planet gear is internally toothed, and said externally toothed central gears are surrounded by said internally toothed planet gear.

15. Coupling according to claim 1 wherein said central gears are internally toothed, said planet gear is externally toothed, and said internally toothed central gears surround said externally toothed planet gear.

16. Coupling according to claim 1 wherein the tooth row of said planet gear is formed with faulty locations at which respective teeth are omitted.

17. Coupling according to claim 16 wherein said faulty locations are disposed at regular intervals along the tooth row of said planet gear.

18. In an elastic coupling with two similar central gears assemblable on respective shaft ends and having rows of teeth, respectively, disposed adjacent one another and having flanks with planar surfaces, and a planet gear with a row of teeth having an angular pitch equal to that of the rows of teeth of the central gears and engaging in tooth gaps of the central gears, the central gears being turnable elastically resiliently so that the flanks of the teeth of the central gears form generally wedge-shaped virtual tooth gaps having a profile varying with reciprocal turning of the central gears, the improvement therein which comprises the central gears having tooth rows disposed adjacent one another in axial direction, and having teeth with planar flanks, the planet gear having teeth formed of a zig-zag metal sheet and having planar tooth flanks slidable during load variation on the planar tooth flanks of the central gear teeth with substantially no deformation in peripheral direction of the gears.

19. Elastic shaft coupling having two coupling halves respectively carrying a plurality of planar inclined surfaces oriented transversely to a force transmission direction therebetween, two respective inclined surfaces of the one and of the other coupling halves facing one another pairwise and defining a radially opening intermediate space, at least one slide member disposed in a radially resilient bearing and engaging in the intermediate space and carrying two planar slide surfaces facing away from one another, each of the planar inclined surfaces being in engagement with one of the slide surfaces, comprising a shperical segment-shaped compensating member formed with at least one of the planar surfaces associated with the other of the planar surfaces and defining the intermediate space, said compensating member being universally pivotally supported in a hollow spherical bearing bushing, from two to twelve of the intermediate spaces being defined by the respective inclined surfaces, a respective slide member being received in each of the intermediate spaces, and holding ring means for pressing the slide members into the respective intermediate chambers, said holding ring means being of radially resilient construction due to noncircular deformability thereof.

20. Elastic shaft coupling according to claim 19 including at least one radial stop disposed between two of the respective intermediate spaces on at least one of the coupling halves for limiting deformation of said holding ring means.

21. Elastic shaft coupling according to claim 20 wherein said stop is adjustable in radial direction.

22. Elastic shaft coupling according to claim 20 wherein said stop is elastic in radial direction.

23. Elastic shaft coupling according to claim 19 including an even number of the slide members, respective pairs of adjacent inclined surfaces associated with the respective slide members being disposed on the same coupling half.

24. Elastic shaft coupling according to claim 19 wherein said holding ring means surround the slide members, and the intermediate spaces widen radially outwardly.

25. Elastic shaft coupling according to claim 19, said holding ring means are surrounded by the slide members, and the intermediate spaces widen radially inwardly.

26. Elastic shaft coupling according to claim 19 including a plurality of said compensating members supported in the coupling halves, said slide members being formed of slide wedges having the slide surfaces thereon.

27. Elastic shaft coupling according to claim 19 including a plurality of said compensating members supported in the slide members and formed with said slide surfaces.

28. Elastis shaft coupling according to claim 27 wherein the inclined surfaces are formed directly on the coupling halves.

29. Elastic shaft coupling according to claim 27 wherein the inclined surfaces are formed on additional spherical segment-shaped compensating members supported in the coupling halves.

* * * * *